United States Patent
Kim et al.

(10) Patent No.: US 12,305,024 B2
(45) Date of Patent: May 20, 2025

(54) CONDUCTIVE COMPOSITE RESIN COMPOSITION FOR PHOTOCURABLE THREE-DIMENSIONAL PRINTING, PREPARATION METHOD THEREOF AND PHOTOCURABLE THREE-DIMENSIONAL PRINTED MATERIAL USING THE SAME

(71) Applicant: KOREA INSTITUTE OF SCIENCE AND TECHNOLOGY, Seoul (KR)

(72) Inventors: Sang Woo Kim, Seoul (KR); Sanghye Kim, Seoul (KR); Heejung Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 704 days.

(21) Appl. No.: 17/203,338

(22) Filed: Mar. 16, 2021

(65) Prior Publication Data

US 2021/0292565 A1  Sep. 23, 2021

(30) Foreign Application Priority Data

Mar. 18, 2020 (KR) .................. 10-2020-0033081
Mar. 11, 2021 (KR) .................. 10-2021-0031858

(51) Int. Cl.

| | |
|---|---|
| *B33Y 70/10* | (2020.01) |
| *B33Y 10/00* | (2015.01) |
| *B33Y 70/00* | (2020.01) |
| *C08K 3/04* | (2006.01) |
| *C08K 3/08* | (2006.01) |
| *C08K 5/09* | (2006.01) |
| *C08K 7/06* | (2006.01) |
| *C08K 9/04* | (2006.01) |
| *C08L 101/12* | (2006.01) |
| *B22F 1/054* | (2022.01) |
| *B33Y 80/00* | (2015.01) |
| *B82Y 30/00* | (2011.01) |
| *B82Y 40/00* | (2011.01) |

(52) U.S. Cl.
CPC ............. *C08L 101/12* (2013.01); *B33Y 10/00* (2014.12); *B33Y 70/00* (2014.12); *B33Y 70/10* (2020.01); *C08K 3/041* (2017.05); *C08K 3/042* (2017.05); *C08K 3/046* (2017.05); *C08K 3/08* (2013.01); *C08K 5/09* (2013.01); *C08K 7/06* (2013.01); *C08K 9/04* (2013.01); *B22F 1/0547* (2022.01); *B33Y 80/00* (2014.12); *B82Y 30/00* (2013.01); *B82Y 40/00* (2013.01); *C08K 2003/0806* (2013.01); *C08K 2201/001* (2013.01); *C08K 2201/011* (2013.01); *C08L 2203/20* (2013.01)

(58) Field of Classification Search
None
See application file for complete search history.

(56) References Cited

U.S. PATENT DOCUMENTS

| | | | | |
|---|---|---|---|---|
| 2005/0136314 | A1* | 6/2005 | Stone ............... | C08L 81/06 429/534 |
| 2005/0245720 | A1* | 11/2005 | Yang ............... | G02B 1/041 528/86 |
| 2015/0299609 | A1* | 10/2015 | Stammer ............ | C10M 107/50 508/208 |
| 2020/0102453 | A1* | 4/2020 | Waicukauski ....... | C08L 69/00 |

FOREIGN PATENT DOCUMENTS

| | | | | |
|---|---|---|---|---|
| CN | 1962428 | A * | 5/2007 | ............ C01B 31/02 |
| CN | 104292400 | A * | 1/2015 | ............ C08F 2/44 |
| KR | 1020180003086 | A | 1/2018 | |
| KR | 1020190019507 | A | 2/2019 | |

OTHER PUBLICATIONS

Machine translation of KR-20190019507-A (no date).*
Machine translation of CN-104292400-A (no date).*
Machine translation of CN-1962428-A (no date).*

* cited by examiner

Primary Examiner — Michael J Feely
(74) Attorney, Agent, or Firm — Rabin & Berdo, P.C.

(57) ABSTRACT

Provided are a conductive composite resin composition for photocurable 3D printing and a preparation method thereof. The conductive composite resin composition for photocurable three-dimensional (3D) printing includes 10 to 90 wt % of a photoreactive viscosity decreasing agent and 10 to 90 wt % of a photocurable resin based on 100 wt % of the conductive composite resin composition, wherein the conductive composite resin composition further comprises 0.01 to 1 wt % of conductive nanostructures, and the conductive composite resin composition has a viscosity of 400 cP or less at a shear rate of 58 $s^{-1}$.

10 Claims, 20 Drawing Sheets

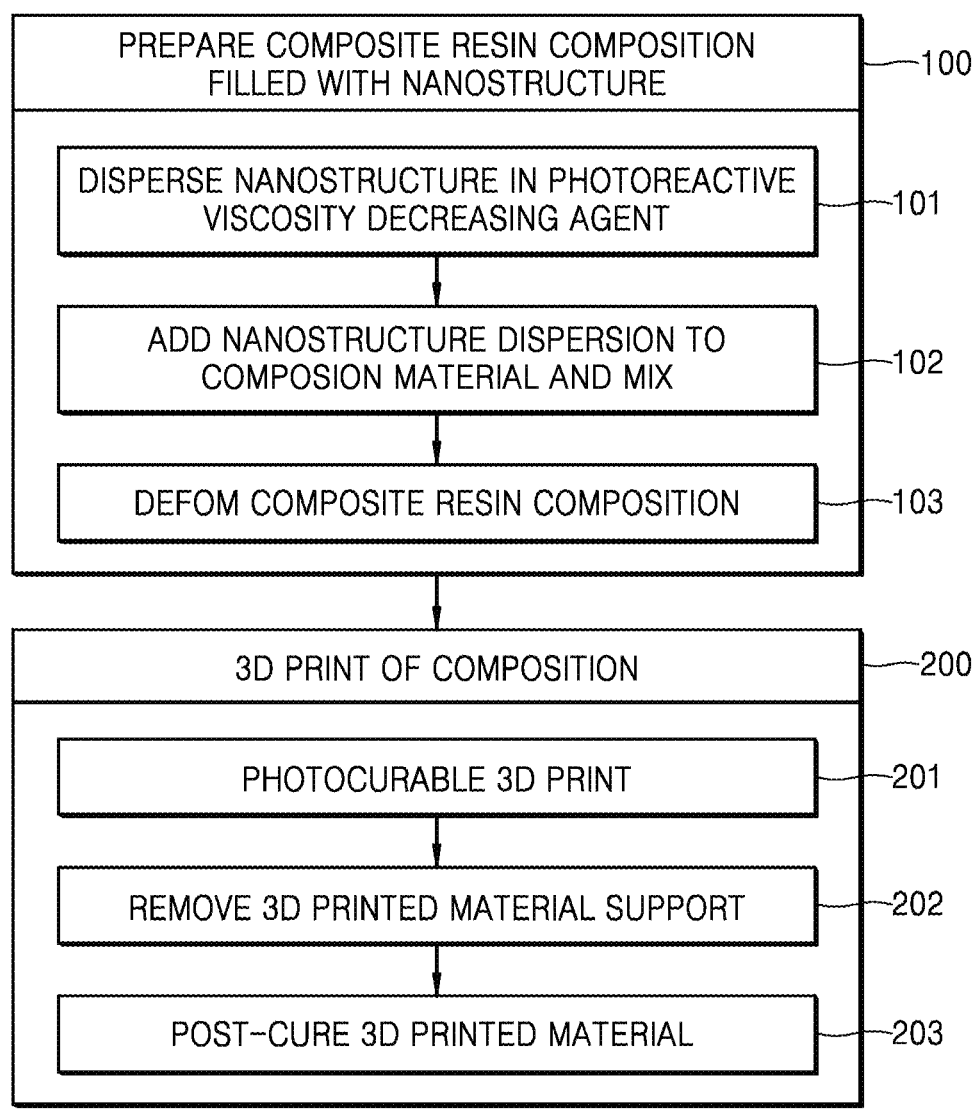

FIG.2A
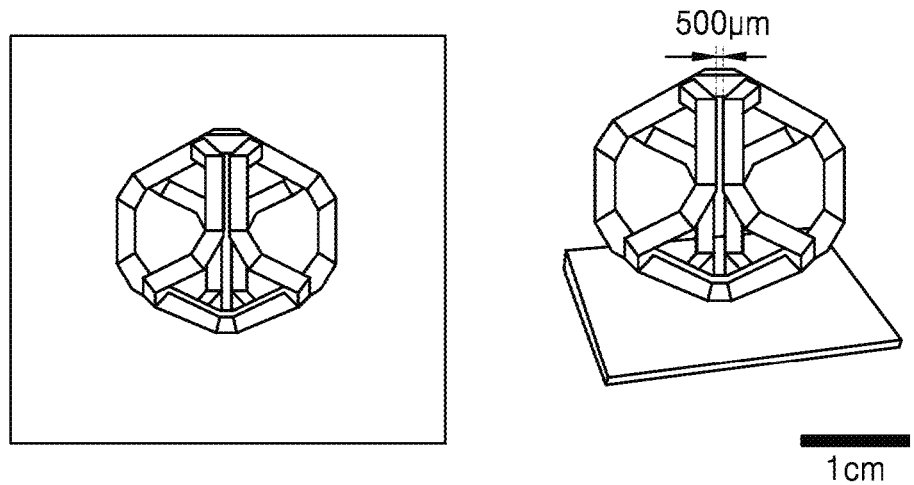
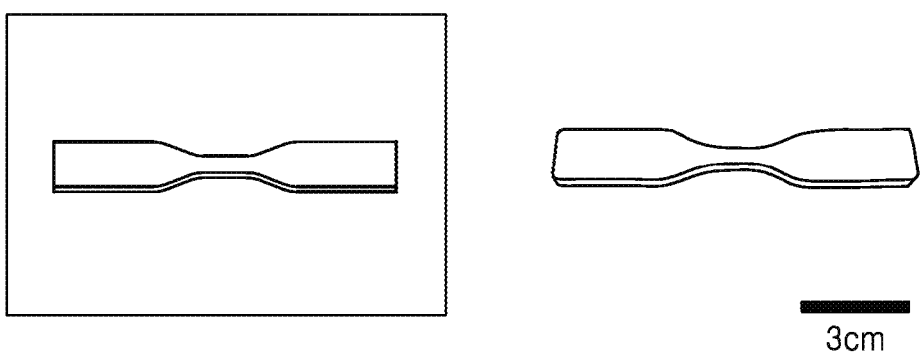
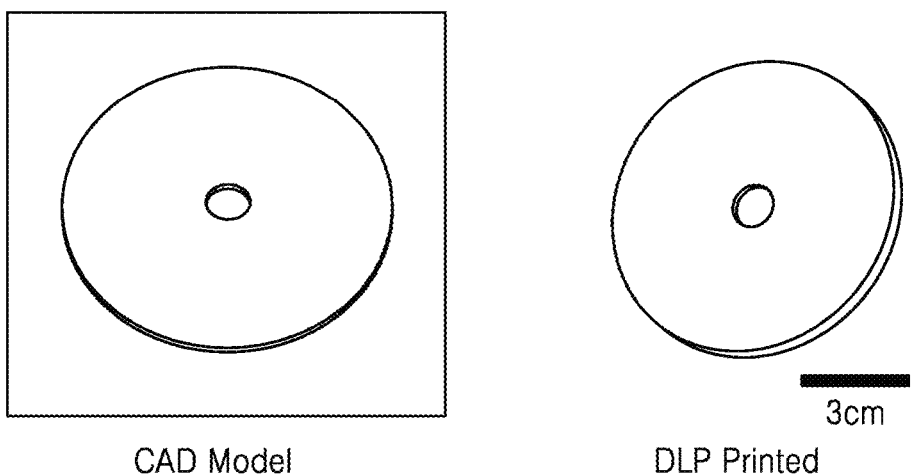
CAD Model        DLP Printed

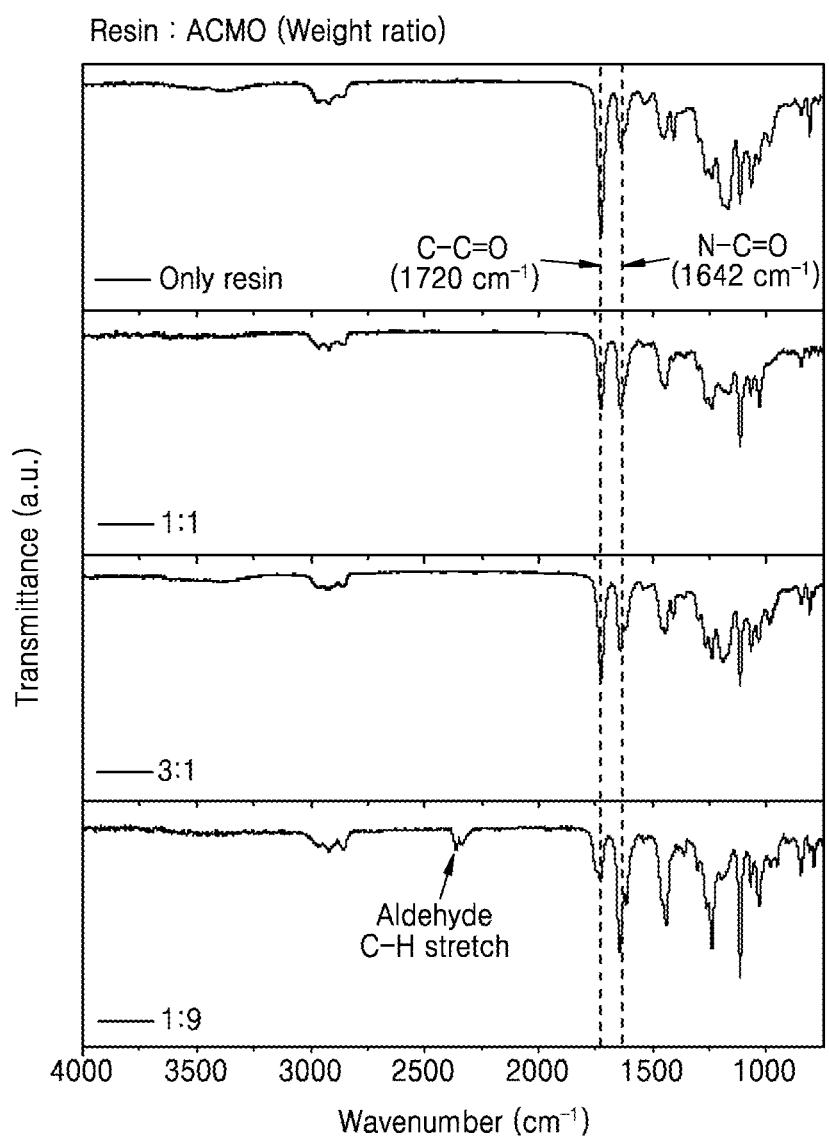

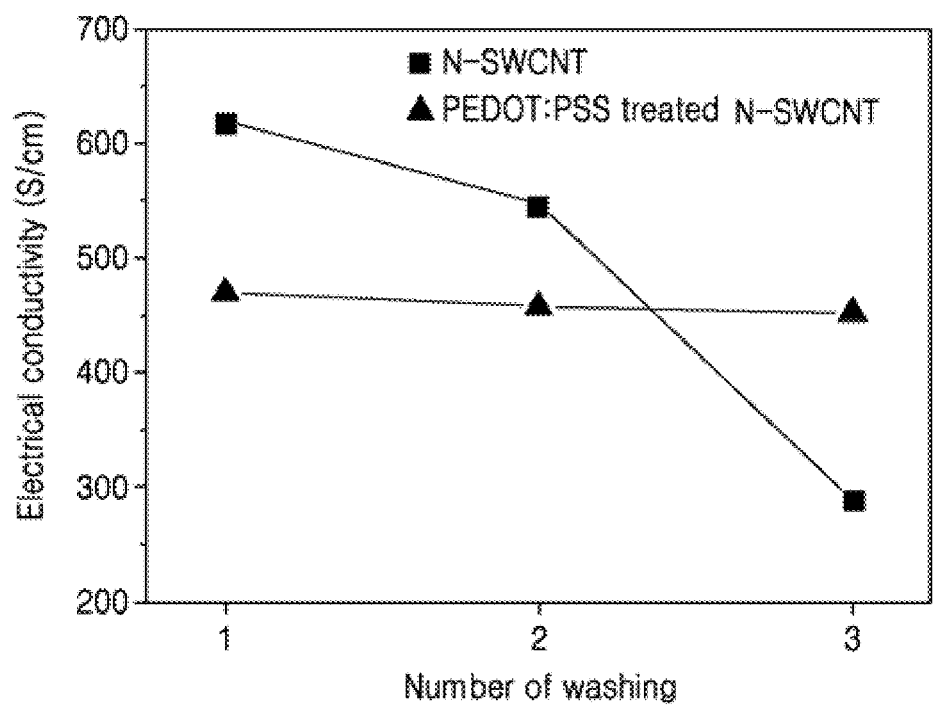

CONDUCTIVE COMPOSITE RESIN COMPOSITION FOR PHOTOCURABLE THREE-DIMENSIONAL PRINTING, PREPARATION METHOD THEREOF AND PHOTOCURABLE THREE-DIMENSIONAL PRINTED MATERIAL USING THE SAME

CROSS-REFERENCE TO RELATED APPLICATION

This application claims the benefit of Korean Patent Application Nos. 10-2020-0033081, filed on Mar. 18, 2020 and 10-2021-0031858, filed on Mar. 11, 2021, in the Korean Intellectual Property Office, the disclosures of which are incorporated herein in their entireties by reference.

BACKGROUND

1. Field

The present disclosure relates to a conductive composite resin composition for photocurable three-dimensional printing, a preparation method thereof, and a photocurable three-dimensional printed material using the same.

2. Description of the Related Art

Due to increasing utilization in recent years, additive manufacturing technology (three-dimensional (3D) printing) has drawn attention and gained increasing interest. As technological convergence actually takes place, there is a need to develop functional resins capable of processing printed materials with electrical and mechanical properties. Polymer-based additive manufacturing technologies may be classified into material extrusion and powder bed fusion based on melt-processing of thermoplastic polymers and vat photo polymerization based on selective photo-crosslinking.

Among them, vat photo polymerization is a 3D printing method of stacking layers one by one by emitting UV light or laser beams to a photocurable resin contained in a tank (vat) and extensive research has been conducted thereon since this method is advantageous in that materials are easily mixed to adjust properties of a final printed material by using a liquid resin and a speed of manufacturing a product increases due to high surface roughness of the printed material. Types of vat photo polymerization include Stereo Lithography (SLA), Digital Light Processing (DLP), and Continuous Liquid Interface Production (CLIP).

However, according to such photocurable 3D printing technologies, problems of limited printing may occur since a filler added to provide particular properties to a printed material decreases flowability of the resin interfering smooth 3D printing and crosslinking density of a polymer matrix decreases during printing as the filler content increases. Therefore, there is a need to develop composite resins with dispersion stability and flowability enabling 3D printing within a filler content range capable of providing electrical, mechanical, and other functional properties.

Particularly, for application to electronic parts, electrodes, heaters, electromagnetic wave shield and absorption, and sensors requiring conductivity, flexibility and mechanical properties, there is a need to develop conductive resin compositions for photocurable 3D printing such that a photocurable 3D printed material satisfies not only conductivity but also electrical and mechanical properties suitable for each requirement.

SUMMARY

The present invention has been proposed to solve the above problems, and an object of the present invention is to provide a method of preparing a conductive composite resin composition for photocurable 3D printing capable of tuning electrical conductivity and mechanical properties in accordance with purposes due to excellent printing quality, although a functional filler is used, without using a volatile organic solvent for processing a 3D printed material and a photocurable 3D printing method using the same. Also, another object of the present invention is to provide a method of preparing a conductive composite resin composition for photocurable 3D printing capable of expressing mechanical strength and electrical properties without post-processing such as high-temperature heat treatment of a printed material after photocurable 3D printing and a photocurable 3D printing method using the same.

However, these problems are exemplary, and the scope of the present invention is not limited thereby.

Additional aspects will be set forth in part in the description which follows and, in part, will be apparent from the description, or may be learned by practice of the presented embodiments.

According to an aspect of the present invention, provided is a conductive composite resin composition for photocurable 3D printing including 10 to 90 wt % of a photoreactive viscosity decreasing agent and 10 to 90 wt % of a photocurable resin based on 100 wt % of the conductive composite resin composition, wherein the conductive composite resin composition further comprises 0.01 to 1 wt % of conductive nanostructures, and the conductive composite resin composition has a viscosity of 400 cP or less at a shear rate of 58 s$^{-1}$.

According to an embodiment of the present invention, the conductive composite resin composition for photocurable 3D printing may further include 0.1 to 20 wt % of a dispersion stabilizer based on 100 wt % of the conductive composite resin composition.

According to an embodiment of the present invention, the conductive nanostructures may include at least one type selected from the group consisting of single-walled carbon nanotubes (SWCNTs), double-walled carbon nanotubes (DWCNTs), multi-walled carbon nanotubes (MWCNTs), graphene, carbon black, carbon nanofibers, inorganic nanoparticles, inorganic nanoplates, core-shell nanoparticles, and metal nanowires.

According to an embodiment of the present invention, the conductive nanostructures may be formed of a material doped with nitrogen.

According to an embodiment of the present invention, the conductive nanostructures may be nitrogen-doped carbon nanotubes, wherein the nitrogen is doped due to pyrrolic defects present in the carbon nanotubes.

According to an embodiment of the present invention, the conductive nanostructures may be nitrogen-doped carbon nanotubes in which PEDOT:PSS is formed on at least one portion of the surface.

According to an embodiment of the present invention, when the conductive nanostructures may be multi-walled carbon nanotubes, a conductive nanostructure content may be in the range of 0.5 to 1 wt % based on 100 wt % of the conductive composite resin composition.

According to an embodiment of the present invention, when the conductive nanostructures are single-walled carbon nanotubes (SWCNTs), a conductive nanostructure content may be in the range of 0.01 to 0.1 wt % based on 100 wt % of the conductive composite resin composition.

According to an embodiment of the present invention, when the conductive nanostructures are nitrogen-doped carbon nanotube, a conductive nanostructure content is in the range of 0.02 to 0.08 wt % based on 100 wt % of the conductive composite resin composition 100 wt %.

According to an embodiment of the present invention, the photoreactive viscosity decreasing agent may include at least one type selected from the group consisting of acryloyl morpholine (ACMO), 1,9-Nonanediol Diacrylate (NDDA), triethylene glycol diacrylate (TEGDA), triethylene glycol dimethacrylate (TEGDMA), polyethylene glycol diacrylate (PEGDA), tripropylene glycol diacrylate (TPGDA), trimethylolpropane triacrylate (TMPTA), isobornyl acrylate (IBOA), 4-hydroxybutyl acrylate (4-HBA), hexanediol diacrylate (HDDA), and hexanediol diacrylate dimethacrylate (HDDMA).

According to an embodiment of the present invention, the photocurable resin may include at least one type selected from the group consisting of epoxy acrylate, polyester acrylate, urethane acrylate, polyether acrylate, and silicone acrylate.

According to another aspect of the present invention, provided is a method of preparing a conductive composite resin composition for photocurable 3D printing, the method including: (a) dispersing conductive nanostructures in a photoreactive viscosity decreasing agent; (b) preparing a conductive composite resin composition by mixing the dispersion with a photocurable resin; and (c) defoaming the conductive composite resin composition, wherein the conductive composite resin composition has a viscosity of 400 cP or less at a shear rate of 58 s$^{-1}$.

According to an embodiment of the present invention, the conductive nanostructures may be nitrogen-doped carbon nanotubes.

According to an embodiment of the present invention, the conductive nanostructures may be nitrogen-doped carbon nanotubes in which PEDOT:PSS is formed on at least one portion of the surface.

According to an embodiment of the present invention, the conductive nanostructures may be prepared by a method including (a') adding a nitric acid solution and a PEDOT:PSS solution to a solution in which carbon nanotubes are dispersed to prepare a mixed solution; and (b') maintaining the mixed solution.

According to an embodiment of the present invention, the conductive nanostructures may be prepared by the method further including (c') washing the residual nitric acid solution after nitrogen is doped.

According to an embodiment of the present invention, the step (b) may further include adding a dispersion stabilizer to the solution.

According to an embodiment of the present invention, the deforming process may be performed at a temperature below 35° C. in a vacuum for 2 to 24 hours.

According to another aspect of the present invention, provided is a photocurable 3D printed material using the conductive composite resin composition.

According to an embodiment of the present invention, when acryloyl morpholine (ACMO) is used as the photoreactive viscosity decreasing agent, an $I_{N-C=O}/I_{C-C=O}$ ratio of the printed material may be in the range of 5% to 95%.

According to an embodiment of the present invention, an electrical conductivity of the printed material may be in the range of 1 E-9 S/m to 10 S/m.

According to an embodiment of the present invention, the printed material may have an increasing electromagnetic wave shielding efficiency as a frequency increases.

According to an embodiment of the present invention as described above, a composite resin composition capable of providing a 3D printed material having excellent mechanical and electrical properties may be prepared by dispersing a filler providing functions in a conductive composite resin composition for 3D printing, and thus various functional 3D structures may be prepared.

Therefore, the 3D structures prepared according to the preparation method of the present invention may produce a printed material with a high resolution at a high printing speed and may be utilized in various industrial fields due to excellent electrical and mechanical properties.

However, the scope of the present invention is not limited by these effects.

BRIEF DESCRIPTION OF THE DRAWINGS

These and/or other aspects will become apparent and more readily appreciated from the following description of the embodiments, taken in conjunction with the accompanying drawings in which:

FIG. 1 is a flowchart illustrating a method of preparing a conductive composite resin composition for photocurable 3D printing and a method of preparing a 3D printed material according to an embodiment of the present invention;

FIGS. 2A and 2B show photographs of 3D printed materials obtained using a conductive composite resin composition for photocurable 3D printing according to an embodiment of the present invention;

FIGS. 5A and 5B show FT-IR analysis results of a composition according to addition of monomer ACMO, as a photoreactive viscosity decreasing agent, to a photocurable resin according to an embodiment of the present invention;

FIG. 14 is a graph illustrating changes in electrical conductivity of N-doped SWCNT and PEDOT:PSS treated N-SWCNT with respect to the number of repeated washing processes according to an embodiment of the present invention;

DETAILED DESCRIPTION

Figure 2B:
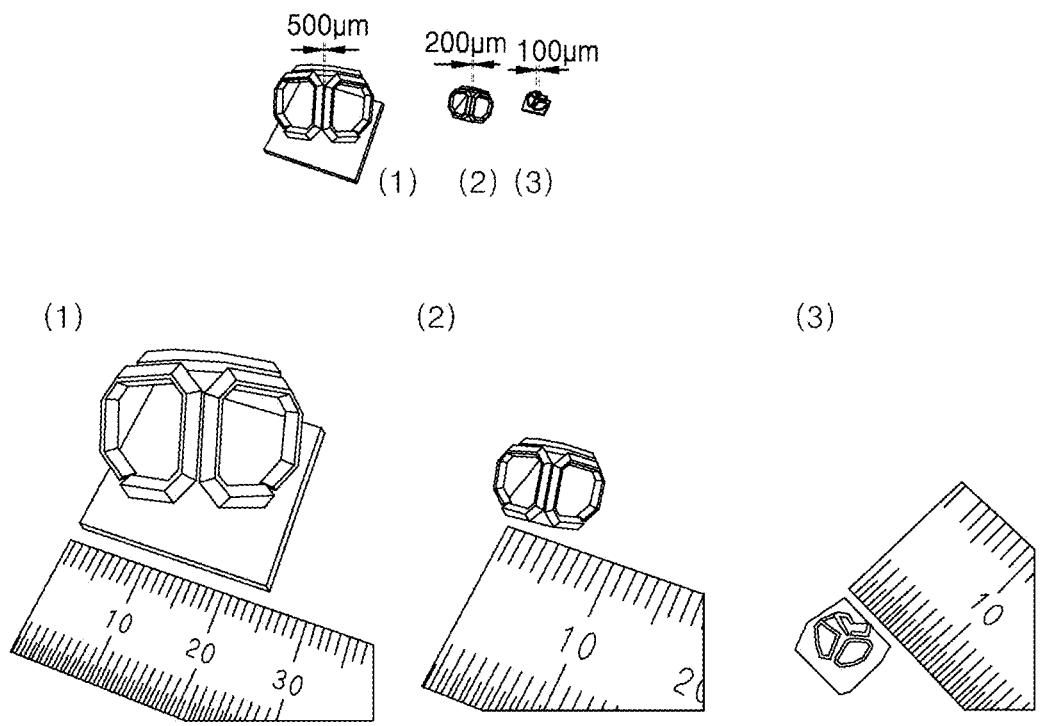

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views and some elements in the drawings may be exaggerated for descriptive convenience.

Hereinafter, embodiments of the present invention will be described in detail with reference to the accompanying drawings so that these embodiments may be readily implemented by those skilled in the art.

Referring to FIG. 1, a method of preparing a conductive composite resin composition for photocurable three-dimensional (3D) printing and a photocurable 3D printing method according to an embodiment of the present invention will be described.

A process of preparing a conductive composite resin composition for photocurable 3D printing according to an embodiment of the present invention (100) includes dispersing conductive nanostructures in a photoreactive viscosity decreasing agent (101), adding the conductive nanostructure dispersion to a photocurable resin-forming material, followed by mixing (102), and defoaming the mixed composite resin composition (103).

First, the conductive nanostructures are dispersed in the photoreactive viscosity decreasing agent to prepare the nanostructure dispersion. The conductive nanostructures serve as a filler for improving or providing physical properties, such as thermal stability, electrical conductivity, mechanical strength, and processibility, of a 3D printed material, and types of the nanostructures may include at least one conductive nanomaterial selected from the group consisting of single-walled carbon nanotubes (SWCNTs), double-walled carbon nanotubes (DWCNTs), multi-walled carbon nanotubes (MWCNTs), graphene, carbon black, carbon nanofibers, inorganic nanoparticles, inorganic nanoplates, core-shell nanoparticles, and metal nanowires, or any combination thereof. Preferably, the conductive nanostructures may be nitrogen-doped (N-doped) carbon nanotubes, for example, nitrogen-doped single-walled carbon nanotubes (N-doped SWCNTs).

In an embodiment, the conductive nanostructures may be N-doped carbon nanotubes, in which PEDOT:PSS is formed on at least one portion of the surface. In this regard, the above-described conductive nanostructures may be, for example, those using single-walled carbon nanotubes (PEDOT:PSS treated N-SWCNT). The above-described conductive nanostructures may be prepared by adding a nitric acid solution and a PEDOT:PSS solution to a solution in which carbon nanotubes are dispersed to prepare a mixed solution, and maintaining the mixed solution. After the carbon nanotubes are doped with nitrogen, a residual nitric acid solution needs to be removed, and thus a washing process is further performed.

Meanwhile, in the N-doped carbon nanotubes, there is a problem in that electrical conductivity rapidly decreases as the above-described washing process proceeds. In this case, by forming PEDOT:PSS on at least one portion of the surfaces of the N-doped carbon nanotubes, i.e., electrical conductivity, thereof may be protected from the above-described washing process. That is, as the number of the washing process increases, electrical conductivity may be maintained without decreasing. The conductive nanostructures may be contained in the resin composition in an amount of 0.01 to 10 wt % based on the resin composition within a range not limiting crosslink density of a matrix during photopolymerization in a process of outputting a 3D printed material. When the conductive nanostructure content is less than 0.01 wt %, a sufficient conductivity cannot be obtained. When the conductive nanostructure content is greater than 10 wt %, it may be difficult to maintain a low viscosity. The nanostructure may have a diameter of 1 nm to 100 nm.

Preferably, the conductive composite resin composition for photocurable 3D printing according to an embodiment of the present invention may be prepared by further adding 0.01 to 1 wt % of the conductive nanostructures based on 100 wt % of the conductive composite resin composition including 10 to 90 wt % of the photoreactive viscosity decreasing agent and 10 to 90 wt % of the photocurable resin.

The photoreactive viscosity decreasing agent may include, as a monofunctional or polyfunctional monomer, one type or at least two types selected from the group consisting of acryloyl morpholine (ACMO), 1,9-nonanediol diacrylate (NDDA), triethylene glycol diacrylate (TEGDA), triethylene glycol dimethacrylate (TEGDMA), polyethylene glycol diacrylate (PEGDA), tripropylene glycol diacrylate (TPGDA), trimethylolpropane triacrylate (TMPTA), isobornyl acrylate (IBOA), 4-hydroxybutyl acrylate (4-HBA), hexanediol diacrylate (HDDA), and hexanediol diacrylate dimethacrylate (HDDMA).

In an embodiment, centrifugation and filtering processes may further be performed to remove undispersed nanostructures including excessive bundles and clusters that inhibit photopolymerization.

Subsequently, the nanostructure dispersion is added to the photocurable resin-forming material and mixed to prepare the conductive composite resin composition. The conductive composite resin composition may further include a photoinitiator and other additives. In an embodiment, the conductive composite resin composition may be prepared by mixing 10 to 90 wt % of the photoreactive viscosity decreasing agent and 10 to 90 wt % of the photocurable resin and may further include 0.01 to 20 wt % of conductive nanostructures, 0.1 to 10 wt % of a photoinitiator, and 0.1 to 20 wt % of other additives based on 100 wt % of the conductive composite resin composition. The composite resin composition may have a viscosity of 10 to 5,000 cps.

Preferably, when the conductive nanostructures are multi-walled carbon nanotubes (MWCNTs), a conductive nanostructure content may be in the range of 0.5 to 1 wt % based on 100 wt % of the conductive composite resin composition. In yet another embodiment, when the conductive nanostructures are single-walled carbon nanotubes (SWCNTs), a conductive nanostructure content may be in the range of 0.01 to 0.1 wt % based on 100 wt % of the conductive composite resin composition. In another embodiment, when the conductive nanostructures are N-doped carbon nanotubes, a conductive nanostructure content may be in the range of 0.02 to 0.08 wt % based on 100 wt % of the conductive composite resin composition.

Preferably, the photoreactive viscosity decreasing agent may be contained in an amount of 10 to 90 parts by weight of in the resin composition. Within the amount range, a low viscosity may be maintained, and thus excellent printability, printing accuracy, and more stable conductivity may be obtained without disturbing photopolymerization. In this case, a viscosity of the resin composition may be in the range of 44 to 81 cps. Preferably, the composite resin composition may include 10 to 90 parts by weight of the photocurable resin. When the amount of the photocurable resin is less than 10 parts by weight, curing property may deteriorate. When the amount of the photocurable resin is greater than 90 parts by weight, workability (printability) may deteriorate.

The photocurable resin used in the composite resin composition may include one type or at least two types selected from the group consisting of epoxy acrylate, polyester acrylate, urethane acrylate, polyether acrylate, and silicone acrylate polymer resins containing a photocurable organic functional group.

In an embodiment, a dispersion stabilizer may be used for stabilizing the nanostructures against the photoreactive viscosity decreasing agent. In this case, types of the dispersion stabilizer may include polyvinyl pyrrolidone (PVP), polystyrene (PSS), sodium dodecyl sulfate (SDS), a polyethylene oxide-based nonionic surfactant (Triton-X), a polyethylene glycol-based surfactant (Tween surfactant), and the like.

In an embodiment, the photoinitiator used in the composite resin composition may include one type or at least two types selected from the group consisting of benzophenoe/amine-based, acetophenone-based, benzoin ether-based, and thioxanthone-based photoinitiators.

In an embodiment, other additives used in the composite resin composition may include one type or at least two types selected from the group consisting of a leveling agent, a UV stabilizer, a UV absorbent, an antioxidant, an adhesion enhancer, a low shrinkage agent, a defoaming agent, and a dispersion stabilizer.

Finally, a process of defoaming the mixed resin composition is performed. For example, by performing the defoaming process at a temperature below 35° C. in a vacuum for 2 to 24 hours, quality of the printed material may be improved during photocurable 3D printing.

The viscosity of the conductive composite resin composition prepared according to the method may be 400 cP or less at a shear rate of 58 $s^{-1}$.

A photocurable 3D printing process according to an embodiment of the present invention (200) may include performing 3D printing in a photopolymerization method using the prepared conductive composite resin composition (201) and post-curing a 3D printed material by UV curing or thermal curing (203), and may further include removing a 3D printed material support (202), if required.

Output conditions for the photocurable 3D printing may include a layer thickness of 20 μm to 300 μm, an exposure times of 0.5 seconds to 200 seconds, a lift distance of 1 mm to 5 mm, and a lift speed of 0.1 mm/s to 2 mm/s. Preferably, a layer thickness of 20 μm to 50 μm, an exposure times of 5 seconds to 15 seconds, a lift distance of 1 mm to 5 mm, and a lift speed of 0.3 mm/s may be used.

The post-curing may be performed by curing with a UV curing device using an LED light source for 5 minutes to 30 minutes or heating at a temperature of 80° C. to 110° C.

In an embodiment of the present invention, when acryloyl morpholine (ACMO) is used as the photoreactive viscosity decreasing agent, an $I_{N-C=O}/I_{C-C=O}$ ratio of the photopolymerized 3D printed material may be in the range of 5% to 95%.

In an embodiment of the present invention, an electrical conductivity of the photopolymerized 3D printed material may be in the range of 1 $E^{-9}$ S/m to 10 S/m.

In an embodiment of the present invention, the photopolymerized printed material using the conductive composite resin composition may have an increasing electromagnetic wave shielding efficiency as a frequency increases.

According to an embodiment of the present invention as described above, a high electrical conductivity may be provided simultaneously lowering a relative viscosity by dispersing the conductive nanostructures having a low dispersibility in the photoreactive viscosity decreasing agent. In addition, a firm conductive 3D printed material having high tensile strength and high elongation rate maintained after 3D printing may be prepared by using the photoreactive viscosity decreasing agent without using an organic solvent. In addition, the conductive composite resin composition prepared according to an embodiment of the present invention does not dissolve in water after 3D printing and may have tensile strength and elongation rate which are adjusted by varying the composition ratio of the composition according to the purpose of use.

Hereinafter, the present invention will be described in more detail with reference to the following preparation examples and experimental examples of a conductive composite resin composition for photocurable 3D printing. However, the following preparation examples and experimental examples are merely presented to exemplify the present invention, and the scope of the present invention is not limited thereto.

<Preparation Example 1> Preparation of Conductive Composite Resin Composition for Photocurable 3D Printing Using SWCNT (100)

0.08 wt % of single-walled carbon nanotubes (SWCNTs), as conductive nanostructures, were added to ACMO and physically dispersed using a high shear stress mixer and ultrasonic dispersion for 0.5 to 2 hours.

10 to 50 parts by weight of the nanostructure dispersion was mixed with 10 to 60 parts by weight of a mixture of acrylate resin and 2-hydroxyethyl acrylate or a mixture of an oligomer and 4-hydroxybutyl acrylate, as a photocurable resin, e.g., an acrylate-based photocurable resin, and then an oligomer, a polymer, a photoinitiator, and an additive were added to thereto and stirred at a temperature of 40° C. or below using a high shear stress and homogenizer for at least 0.5 hours. In this case, a photoreactive viscosity decreasing agent may further be added thereto in consideration of viscosity of the composite resin composition according to the content of the filled nanostructures. The final content of the photoreactive viscosity decreasing agent was set in the range of 30 to 90 parts by weight based on the total resin composition.

Thereafter, a degassing process was performed at a temperature of 35° C. or below in a vacuum for 2 hours to 24 hours.

<Preparation Example 2> Preparation of Conductive Composite Resin Composition for Photocurable 3D Printing Using PEDOT:PSS Treated N-SWCNT (100)

0.05 to 0.2 wt % of SWCNTs and 0.05 to 0.2 wt % of Triton X-100 were added to 200 ml of distilled water and dispersed using a homogenizer at 7500 rpm for 15 minutes, and then sonicated for 40 minutes at 20 kHz. Then, 0.1 to 2 wt % of a 1% PEDOT:PSS solution was added thereto to prepare a SWCNT dispersion. A 2 M to 6 M nitric acid solution was added to the SWCNT dispersion and stirred using a magnetic bar at a rate of 1000 rpm at a temperature of 20° C. to 90° C. for 30 minutes to prepare a mixed solution. The mixed solution was maintained for a predetermined period such that the inside of SWCNTs were doped with nitrogen and PEDOT:PSS was formed on at least one portion of the surfaces thereof. In this case, the residual nitric acid solution remaining after being used for nitrogen doping may be washed with at least one of distilled water, ethanol, and acetone. Through the above-described process, nitrogen-doped SWCNT treated with PEDOT:PSS (PEDOT:PSS treated N-SWCNT) may be prepared.

Subsequently, a conductive composite resin composition for photocurable 3D printing was prepared in the same manner as in Preparation Example 1, except that PEDOT:PSS treated N-SWCNTs were used as conductive nanostructures unlike Preparation Example 1.

<Preparation Example 3> Preparation of Printed Material with Photocurable 3D Printer Using SWCNT (200)

The composite resin composition prepared according to the method of Preparation Example 1 was filled in a photocurable 3D printer tray and printing was conducted in accordance with a designed file. In this case, printing conditions such as shapes of the filled nanostructure, type and composition ratio of the photoreactive viscosity decreasing agent, thickness of a cured layer according to required printing time, exposure time, formation of an aid, lift distance, and lift speed may be adjusted.

A support of the 3D structure printed according to the above-described method was removed. The support may be omitted according to the printing type.

Thereafter, a post-curing process was performed to improve hardness of the 3D structure.

Experimental Example 1

FIGS. 2A and 2B show photographs of 3D printed materials according to Preparation Example 3. FIG. 2A shows photographs of CAD models and actual 3D printed materials with various shapes, and FIG. 2B shows photographs of 3D structures with various sizes obtained by photocured 3D printing.

Experimental Example 2

Figure 3:
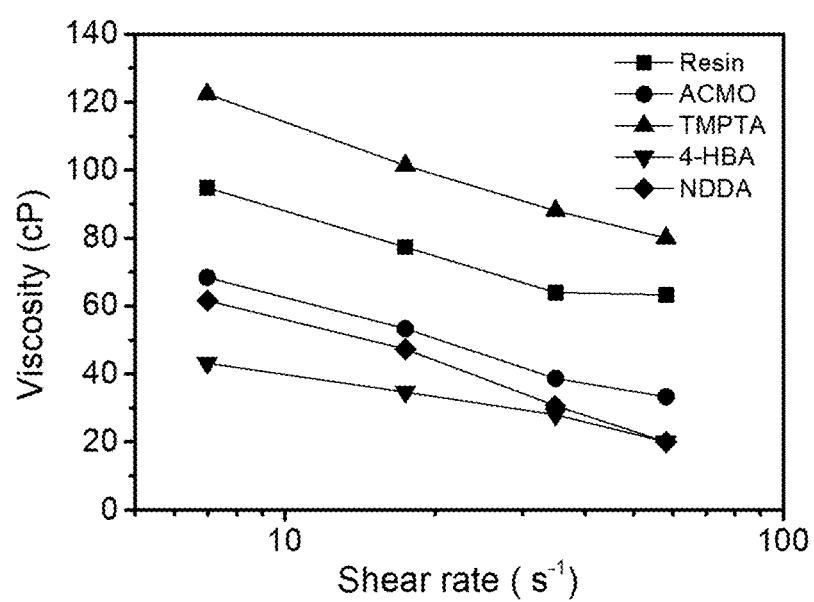
FIG. 3 is a graph illustrating viscosity when a photoreactive viscosity decreasing agent is added to a photocurable resin according to an embodiment of the present invention in a weight ratio of 1:1.

FIG. 3 is a graph illustrating viscosity when a photoreactive viscosity decreasing agent is added to a photocurable resin according to an embodiment in a weight ratio of 1:1. Referring to FIG. 3 and Table 1, when a monomer, as a photoreactive viscosity decreasing agent, was not added to an acrylate-based photocurable resin, the viscosity was 94.8 cP at a shear rate of 7 $s^{-1}$. The viscosity varied according to the type of the monomer, as the photoreactive viscosity decreasing agent, added according to the examples shown in Table 1. At a shear rate of 7 $s^{-1}$, the viscosity of ACMO was 68.4 cP, the viscosity of TMPTA was 122.4 cP, and the viscosity of 4-HBA was 43.2 cP, and the viscosity of NDDA was 61.6 cP.

TABLE 1

| | | Shear rate ($s^{-1}$) | | | |
| | | 7 | 17 | 35 | 58 |
| Type of monomer | | Viscosity (cP) | | | |
|---|---|---|---|---|---|
| Comparative Example1 | — | 94.8 | 77.3 | 64 | 63.3 |
| Example 1 | ACMO | 68.4 | 53.3 | 38.7 | 33.3 |
| Example 2 | TMPTA | 122.4 | 101.3 | 88 | 80 |
| Example 3 | 4-HBA | 43.2 | 34.7 | 28 | 20 |
| Example 4 | NDDA | 61.6 | 47.3 | 30.7 | 20 |

Experimental Example 3

Figure 4:
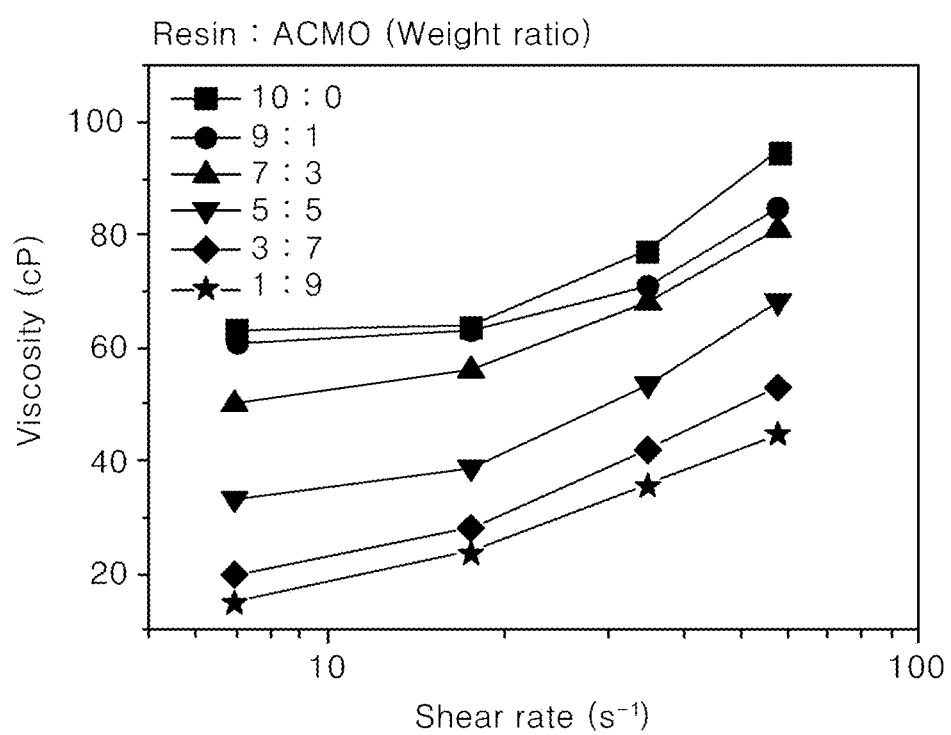
FIG. 4 is a graph illustrating changes in viscosity according to the amount of monomer ACMO, as a photoreactive viscosity decreasing agent, added to a photocurable resin according to an embodiment of the present invention.

FIG. 4 and Table 2 show viscosity (cP), hardness (MPa), and converted modulus of elasticity (MPa) at a shear rate 58 $s^{-1}$ when the content of ACMO, as the photoreactive viscosity decreasing agent, varied from 0 to 90 parts by weight relative to the photocurable resin. The hardness and the converted modulus of elasticity were values measured using a nano indenter. Nanoindentation may quantitatively measure mechanical properties such as hardness and modulus of elasticity of a material using a sharp indenter via nano-scale rod and depth control. Based on the measured data, the converted modulus of elasticity (Er) and hardness (H) were calculated. The viscosity decreases as the weight ratio of ACMO increases in the total composition. Hardness and converted modulus of elasticity decrease with the increase in the weight ratio of ACMO and increase again after the weight ratio of ACMO exceeds a predetermined level.

TABLE 2

|  | ACMO content (wt %) | Viscosity (cP) | Hardness (MPa) | Converted modulus of elasticity (MPa) |
|---|---|---|---|---|
| Comparative Example 1 | 0 | 94.8 | 82 | 1766 |
| Example 5 | 10 | 84.8 | 22 | 538 |
| Example 6 | 30 | 81 | 8 | 593 |
| Example 7 | 50 | 68.4 | 39 | 1624 |
| Example 8 | 70 | 53.2 | 32 | 2844 |
| Example 9 | 90 | 44.8 | 177 | 4055 |

Experimental Example 4

Figure 5B:
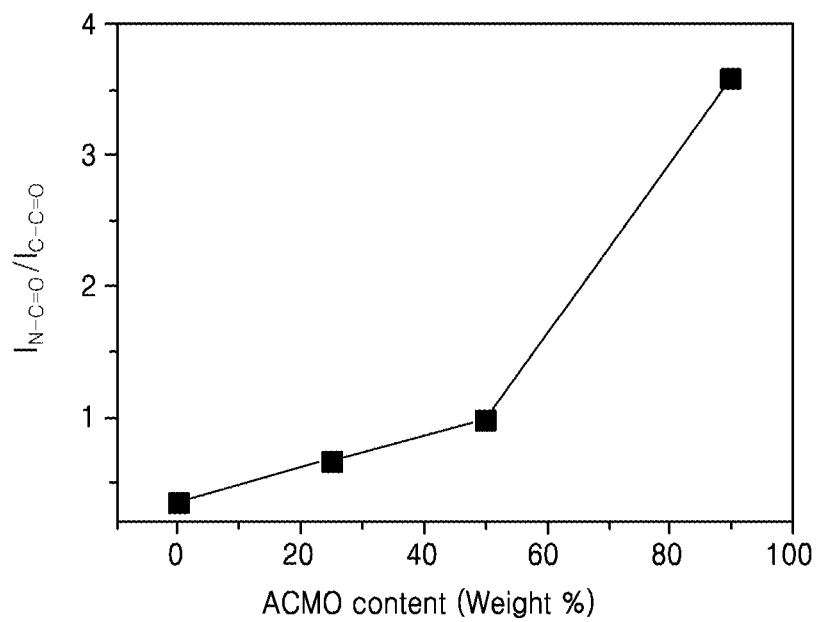

FIGS. 5A and 5B show FT-IR analysis results of a composition according to addition of the monomer ACMO, as a photoreactive viscosity decreasing agent, to a photocurable resin according to an embodiment of the present invention. FIG. 5A is a graph illustrating IR spectrum results according to an increase in the weight ratio of ACMO relative to the photocurable resin and FIG. 5B is a graph illustrating changes in intensity ratio of peaks in the spectrum. In FIG. 5A, a peak at a wavenumber of 1720 cm$^{-1}$ is a peak appearing by C—C=O bond of urethane acrylate which is a main chain of the photocurable resin, and the peak at a wavenumber of 1642 cm$^{-1}$ is a peak appearing by N—C=O bond of the monomer ACMO as the photoreactive viscosity decreasing agent. In the total composition, it can be seen that the intensity at 1642 cm$^{-1}$ is relatively stronger than that at the intensity at 1720 cm$^{-1}$ as the content of the photoreactive viscosity decreasing agent increases.

Experimental Example 5

Figure 6A:
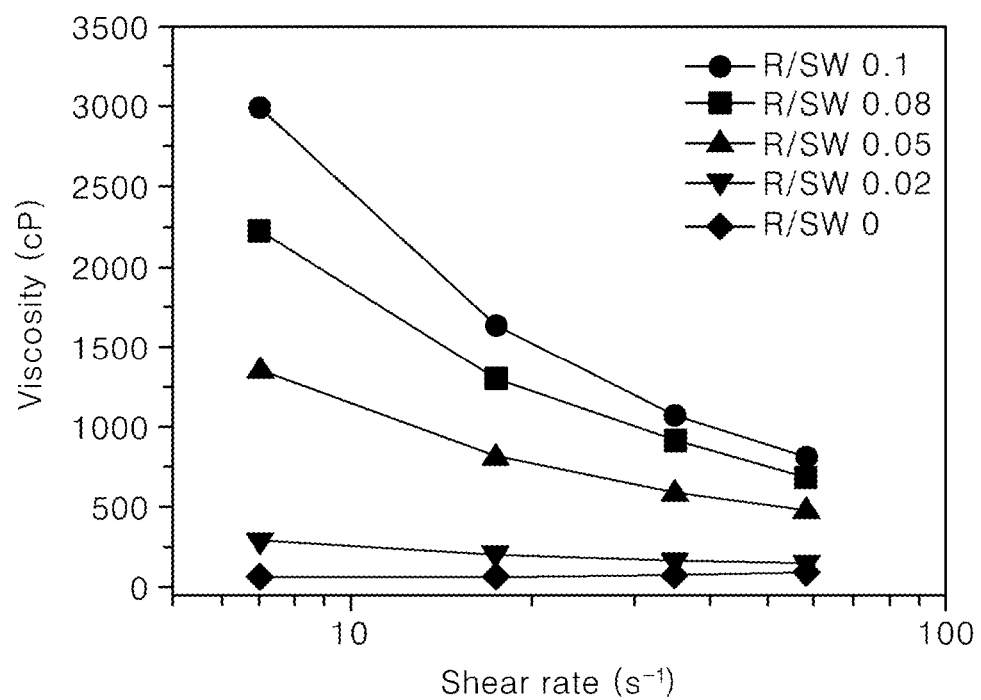
FIGS. 6A and 6B show graphs illustrating changes in viscosity according to the nanostructure content of a photocurable composite resin composition filled with the nanostructures according to an embodiment of the present invention.
Figure 6B:
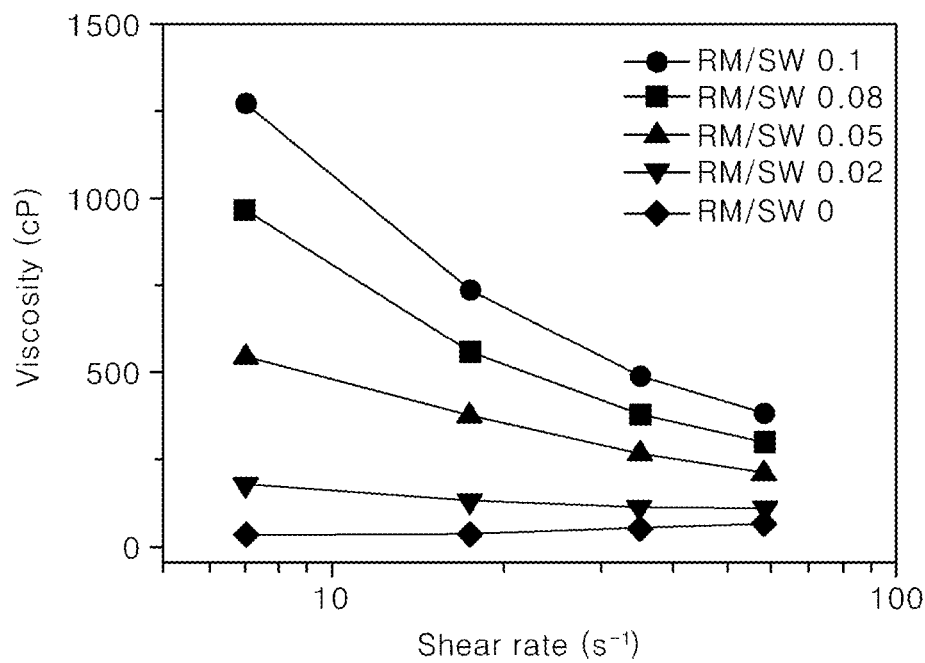

FIGS. 6A and 6B show graphs illustrating changes in viscosity according to the nanostructure content of a conductive composite resin composition filled with the nanostructures according to an embodiment of the present invention.

FIG. 6A is a graph illustrating changes in viscosity according to the nanostructure content of the conductive composite resin composition filled with the nanostructures without adding a photoreactive viscosity decreasing agent thereto, and FIG. 6B is a graph illustrating changes in viscosity of the composite resin composition including 50 parts by weight of ACMO, as the photoreactive viscosity decreasing agent, based on the weight of the composition resin composition, according to the nanostructure content.

Table 3 shows viscosity according to the nanostructure content at a shear rate of 7 s$^{-1}$ in the conductive composite resin composition to which the photoreactive viscosity decreasing agent was not added and in the conductive composite resin composition to which the photoreactive viscosity decreasing agent was added. Referring to Table 3, the viscosity of the conductive composite resin composition added with the photoreactive viscosity decreasing agent was far lower than that of the conductive composite resin composition to which the photoreactive viscosity decreasing agent was not added.

TABLE 3

| Photoreactive viscosity decreasing agent SWCNT content (wt %) | Not-added | Added |
|---|---|---|
|  | Viscosity (cP) (@7 s$^{-1}$) | |
| 0 | 94.8 | 68.4 |
| 0.02 | 291.7 | 180 |
| 0.05 | 1,350 | 760 |
| 0.1 | 3,000 | 1,767 |
| 0.15 | 3,667 | 2,208 |

Experimental Example 6

Figure 7:
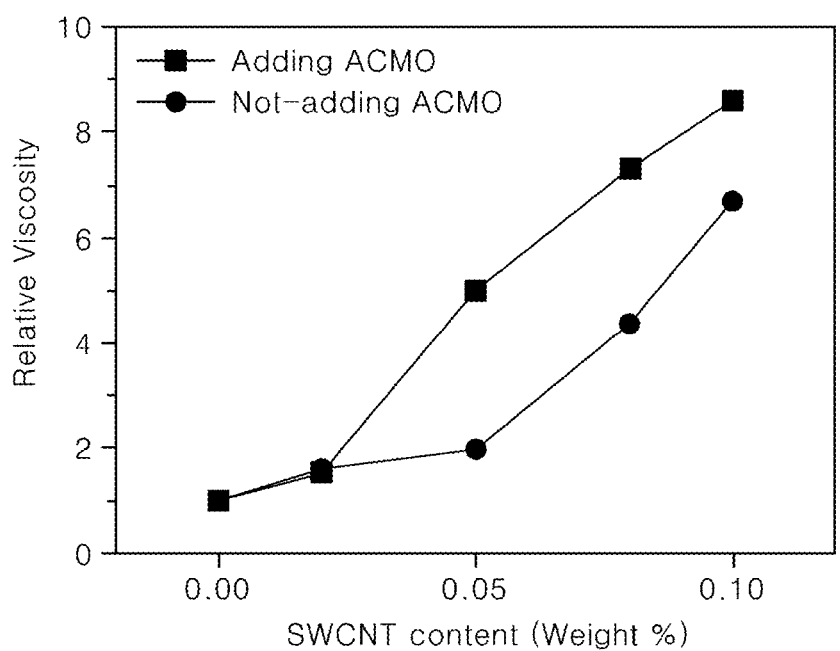
FIG. 7 is a graph illustrating relative viscosity according to the nanostructure content in a photocurable resin composition not added with a photoreactive viscosity decreasing agent and a photocurable resin composition added with the photoreactive viscosity decreasing agent.

FIG. 7 is a graph illustrating relative viscosity according to the nanostructure content in a photocurable resin composition not added with a photoreactive viscosity decreasing agent and a photocurable resin composition added with the photoreactive viscosity decreasing agent.

Table 4 shows electrical conductivity and relative viscosity of conductive composite resin compositions to which 50 parts by weight of ACMO, as the photoreactive viscosity decreasing agent, was added based on the total weight of the composition with respect to the nanostructure content. Throughout the specification, RM indicates the conductive composite resin composition not including the nanostructures, and RM/SW, RM/MW, and RM/N-SW indicate conductive composite resin compositions filled with SWCNTs, MWCNTs, and N-doped SWCNTs, respectively.

TABLE 4

| Sample name | RM | RM/SW 0.02 | RM/SW 0.05 | RM/SW 0.08 | RM/SW 0.1 |
|---|---|---|---|---|---|
| SWCNT content (wt %) | 0 | 0.02 | 0.05 | 0.08 | 0.1 |
| Electrical conductivity (S/m) | <1E−7 | 0.043 | 0.55 | 0.78 | 1.0 |
| Relative viscosity | 1 | 2.6 | 11.1 | 25.8 | 32.3 |

In comparison with the case not including the SWCNT nanostructures, electrical conductivity of the conductive composite resin composition increases and relative viscosity also increases as the content of SWCNT nanostructures increases.

Experimental Example 7

Figure 8A:
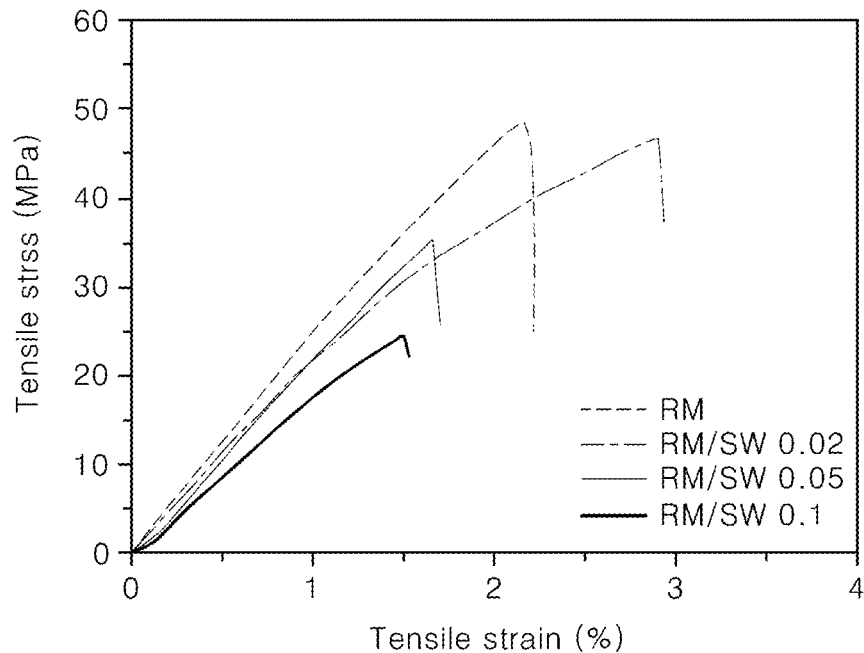
FIGS. 8A and 8B shows graphs illustrating tensile stress test results of a photocurable composite resin composition filled with nanostructures according to an embodiment of the present invention with respect to the nanostructure content.
Figure 8B:
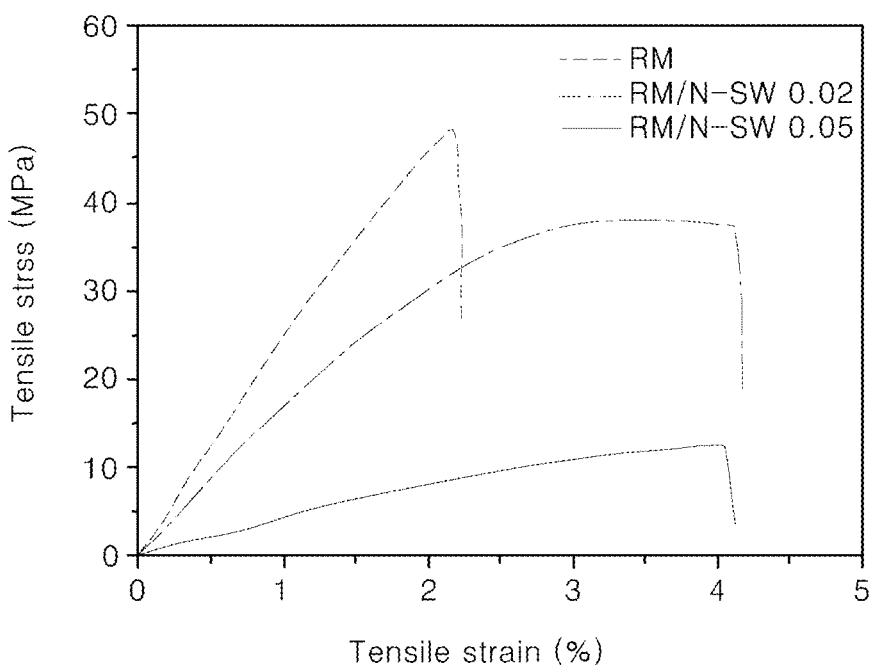

FIGS. 8A and 8B show graphs illustrating tensile stress test results of a photocurable composite resin composition filled with nanostructures according to an embodiment of the present invention with respect to the nanostructure content.

Single-walled carbon nanotubes (SW) were used as a nanofiller of the conductive composite resin composition in the 3D printed material used in FIG. 8A, and modified single-walled carbon nanotubes (N-SW) were used in FIG. 8B. Based on the results of FIG. 8A, 8B and Table 5, although tensile strength decreases as the content of the nanostructures filled in the photocurable 3D printed material increases, elongate rate of the final printed material considerably increases in accordance with modification properties of the filled nanostructures. This indicates that tensile strength and elongation rate may be adjusted in accordance with the surface properties and the 3D photocurable printed material may provide properties suitable for flexible electrodes, flexible electromagnetic wave shielding materials, flexible heaters, and wearable sensors.

TABLE 5

| Sample name | Nanostructure type/content (wt %) | Tensile strength (MPa) | Elongation rate (%) | Modulus of elasticity (MPa) |
|---|---|---|---|---|
| RM | 0 | 49.3 | 2.19 | 25.1 |
| RM/SW 0.02 | SWCNT/0.02 | 46.8 | 2.9 | 23.95 |
| RM/SW 0.05 | SWCNT/0.05 | 35.3 | 1.7 | 20.2 |
| RM/SW 0.1 | SWCNT/0.1 | 24.7 | 1.5 | 16.8 |
| RM/N-SW 0.02 | N-doped SWCNT/0.02 | 37.3 | 4.1 | 17.3 |
| RM/N-SW 0.05 | N-doped SWCNT/0.05 | 12.5 | 4.1 | 4.2 |

Experimental Example 8

Figure 9:
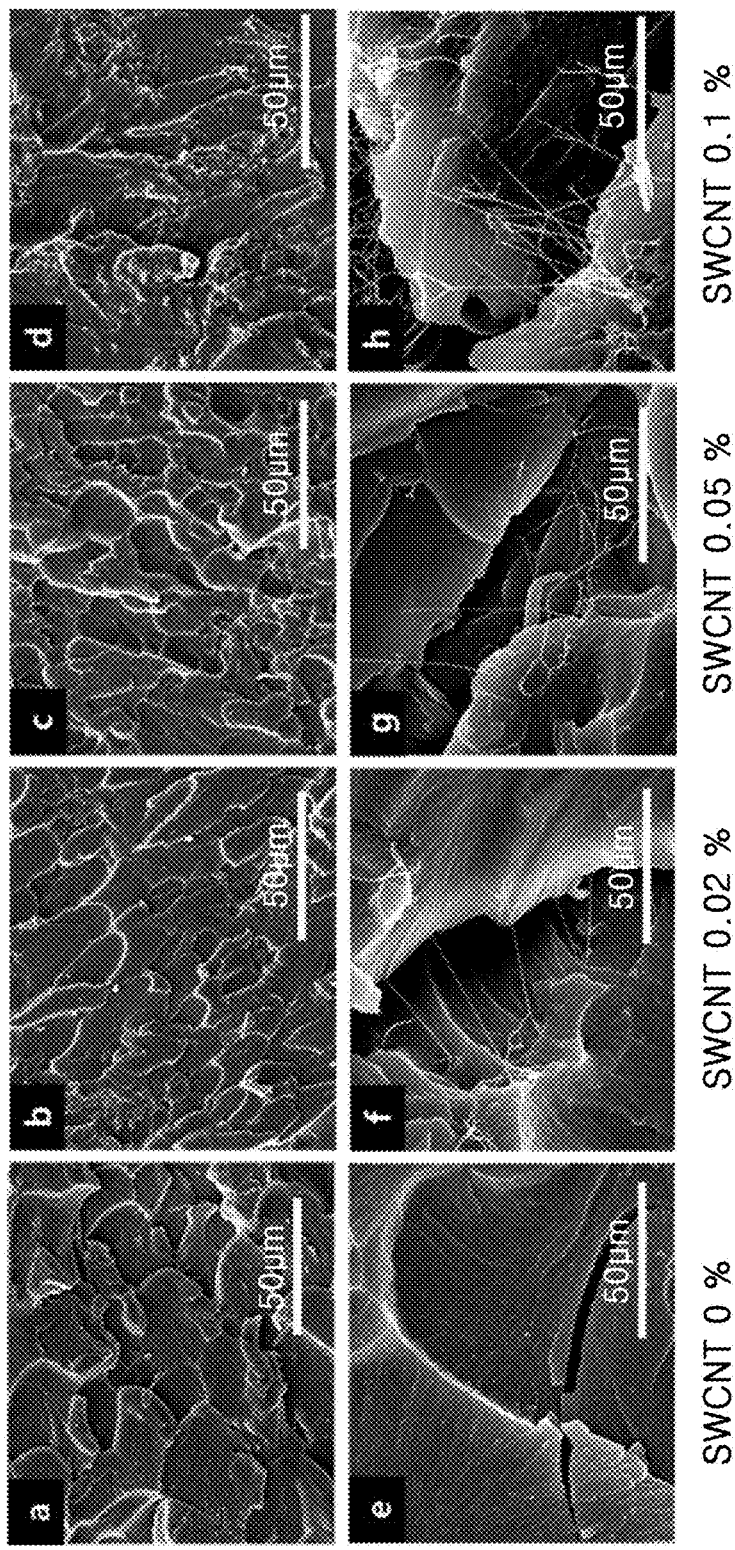
FIG. 9 shows SEM images of cross-sections of conductive nanostructure printed materials for photocurable 3D printing prepared according to a preparation method according to an embodiment of the present invention.

FIG. 9 shows SEM images of fracture cross-sections after tensile tests of a conductive nanostructure printed material for photocurable 3D printing prepared according to a preparation method according to an embodiment of the present invention. (A) and (e) of FIG. 9 are SEM images of cross-sections and destruction gap of 3D printed materials obtained using photocurable resin not filled with nanostructures. (B) to (d) of FIG. 9 are SEM images of cross-sections of 3D structures printed using a photocurable resin filled with nanostructures, and (f) to (h) of FIG. 9 are SEM images showing destruction gap of structures corresponding to (b) to (d).

Experimental Example 9

Figure 10A:
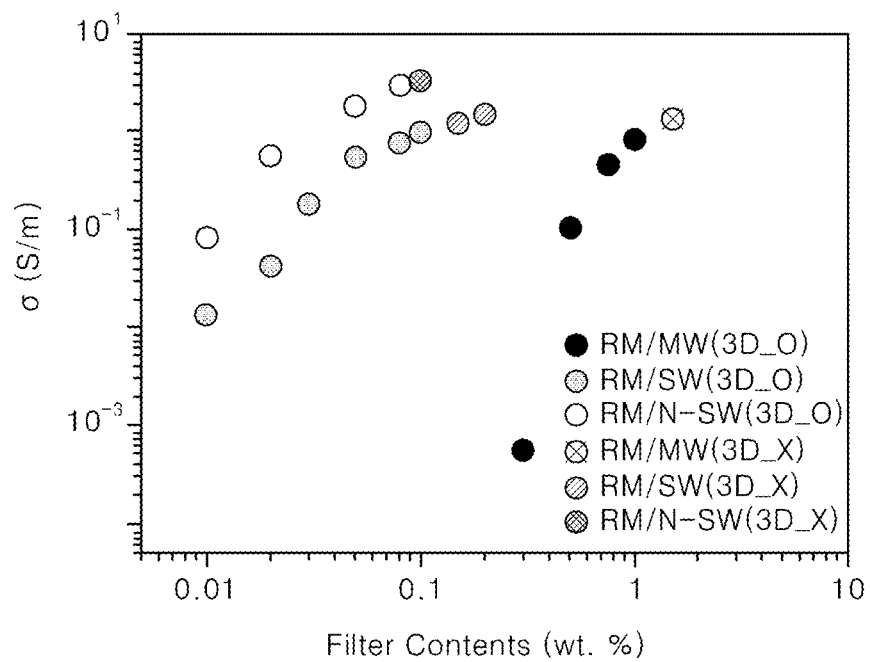
FIG. 10A to 10D show graphs illustrating electrical conductivity and viscosity of printed materials of conductive nanostructures for photocurable 3D printing according to types of filled nanostructures.
Figure 10B:
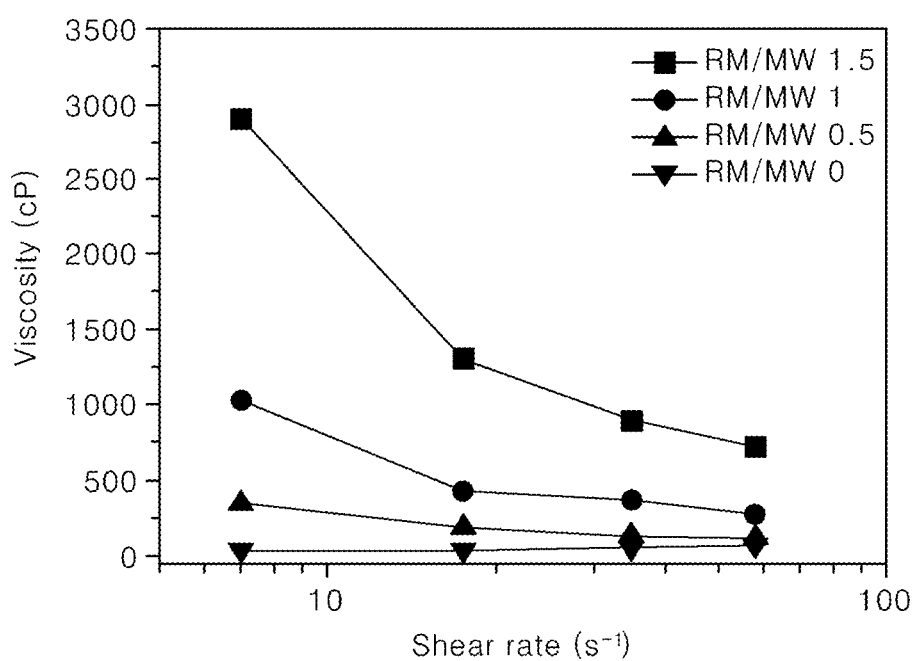

FIGS. 10A and 10B show graphs illustrating electrical conductivity and viscosity of composite resin compositions filled with nanostructures, and Table 6 shows viscosity, electrical conductivity, and availability for photocurable 3D printing with respect to types of nanostructures filled in the composite resin compositions.

Figure 10C:
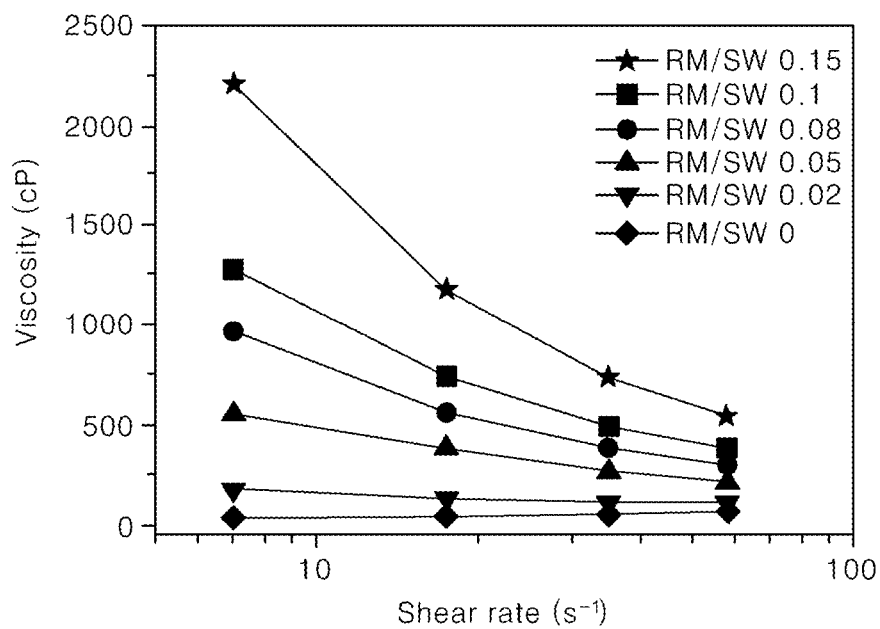
Figure 10D:
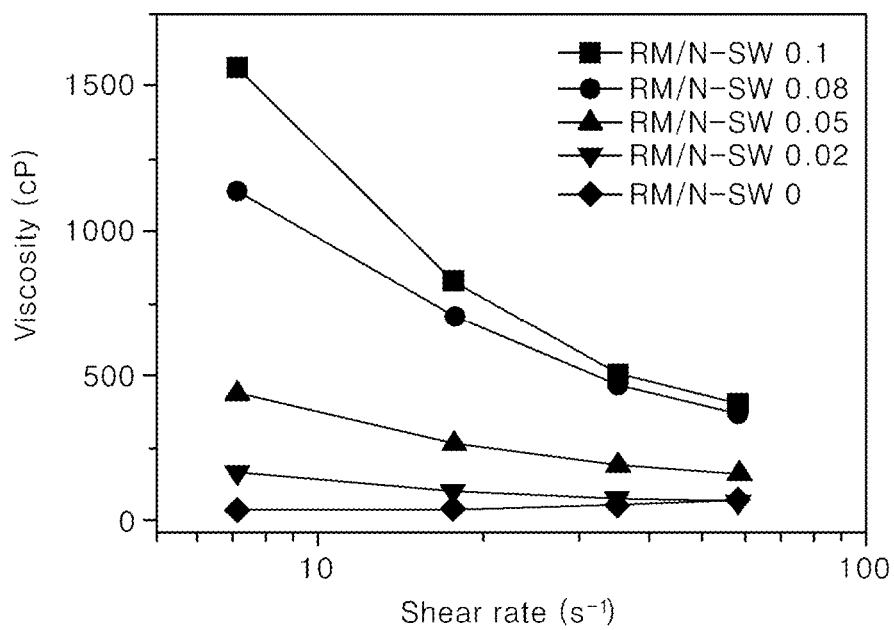

FIG. 10A is a graph illustrating electrical conductivity according to type and filling content of nanostructures. FIG. 10B to 10D are graphs illustrating viscosity varying according to the nanostructure content when MWCNTs, SWCNTs, N-doped carbon nanotubes, for example, N-doped SWCNTs were used as fillers, respectively. Referring to Table 6, it can be seen that the viscosity enabling photocurable 3D printing is 400 cP or less at a shear rate of 58 s$^{-1}$.

TABLE 6

| Sample name | Type of nanostructure | Nanostructure content (wt %) | Electrical conductivity (S/m) | Viscosity (cP) (@58 s$^{-1}$) | Photocurable 3D printing |
|---|---|---|---|---|---|
| RM/MW 0.5 | MWCNT | 0.5 | 0.105 | 144 | O |
| RM/MW 0.75 | | 0.75 | 0.46 | — | O |
| RM/MW 1 | | 1 | 0.83 | 270 | O |
| RM/MW 1.5 | | 1.5 | 1.37 | 723 | X |
| RM/SW 0.01 | SWCNT | 0.01 | 0.014 | — | O |
| RM/SW 0.02 | | 0.02 | 0.043 | 110 | O |
| RM/SW 0.05 | | 0.05 | 0.55 | 213 | O |
| RM/SW 0.08 | | 0.08 | 0.78 | 299 | O |
| RM/SW 0.1 | | 0.1 | 1.0 | 384 | O |
| RM/SW 0.15 | | 0.15 | 1.23 | 545 | X |
| RM/SW 0.2 | | 0.2 | 1.51 | — | X |
| RM/N-SW 0.02 | N-doped | 0.02 | 0.57 | 65 | O |
| RM/N-SW 0.05 | SWCNT | 0.05 | 1.8 | 158 | O |
| RM/N-SW 0.08 | | 0.08 | 2.97 | 353 | O |
| RM/N-SW 0.1 | | 0.1 | 3.3 | 401 | X |
| RM/N-SW 0.15 | | 0.15 | — | 1158 | X |

Experimental Example 10

Figure 11A:
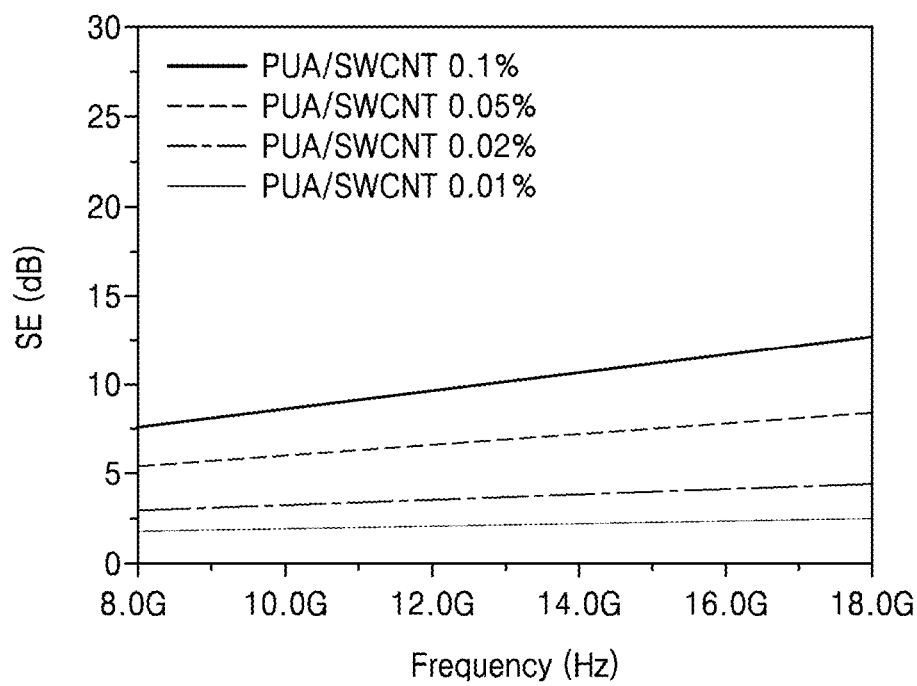
FIGS. 11A and 11B show graphs illustrating frequency dependence of electromagnetic wave shielding values of conductive nanostructure printed material for photocurable 3D printing by doping of filled nanostructures in X band (8 to 12 GHZ) and Ku band (12 to 18 GHZ)
Figure 11B:
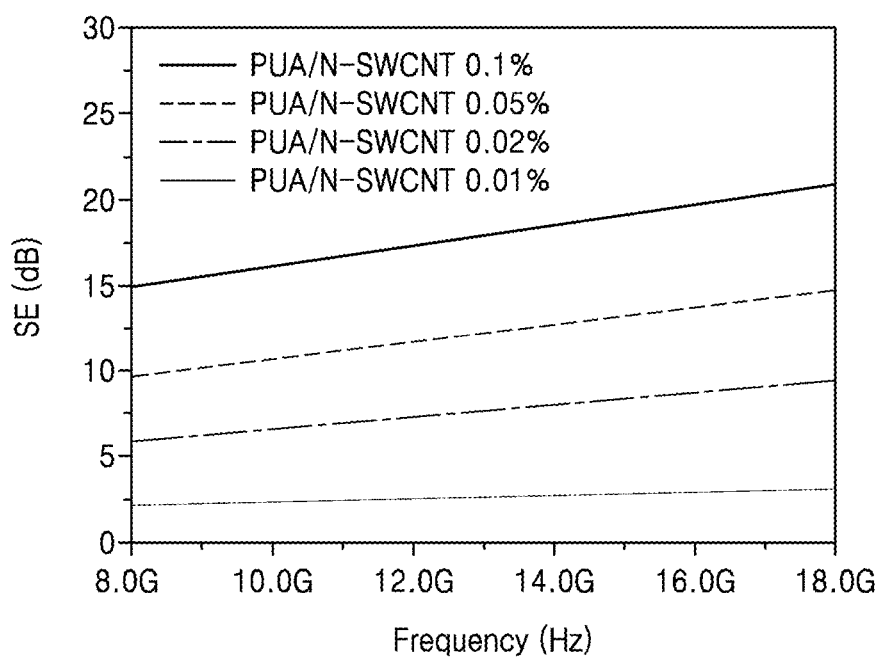

FIGS. 11A and 11B show graphs illustrating results of measuring electromagnetic wave shielding properties of conductive composite resin compositions filled with nanostructure according to an embodiment of the present invention, with respect to the nanostructure content.

single-walled carbon nanotubes (SWCNTs) were used as a nanofiller of the conductive composite resin composition for the 3D printed material used in FIG. 11A, and single-walled carbon nanotubes (SWCNTs) modified with nitrogen were used as a nanofiller of FIG. 11B. Referring to the results of FIGS. 11A and 11B, it can be seen that the electromagnetic wave shielding efficiency increases at an X band and Ku band (8 to 18 GHZ) as the content of the nanostructures filled in the photocurable 3D printed material increases and it may be confirmed that the electromagnetic wave shielding efficiency increases as the doping level of the filled nanostructures increases. In addition, an electromagnetic wave shielding material printed by photocurable 3D printing using the conductive composite resin composition filled with the nanostructure exhibited increasing electromagnetic wave shielding efficiency as the frequency increases in the range of 8 to 18 GHz unlike conventional conductive electromagnetic wave shielding materials.

Experimental Example 11

Figure 12A:
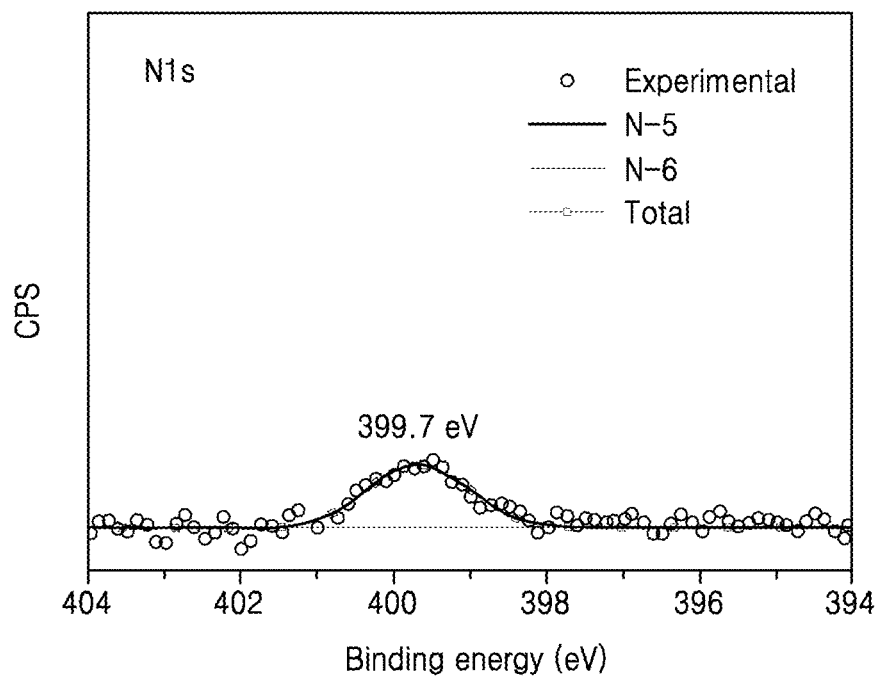
FIGS. 12A to 12C show full scan N1s XPS spectrum analysis results of N-doped SWCNTs in different concentrations of a nitric acid solution.
Figure 12B:
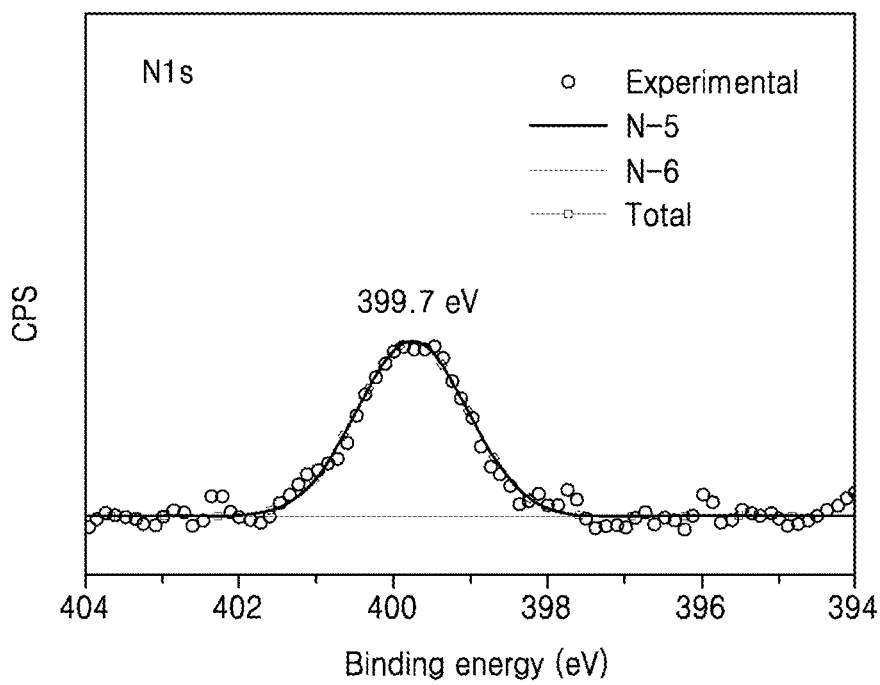
Figure 12C:
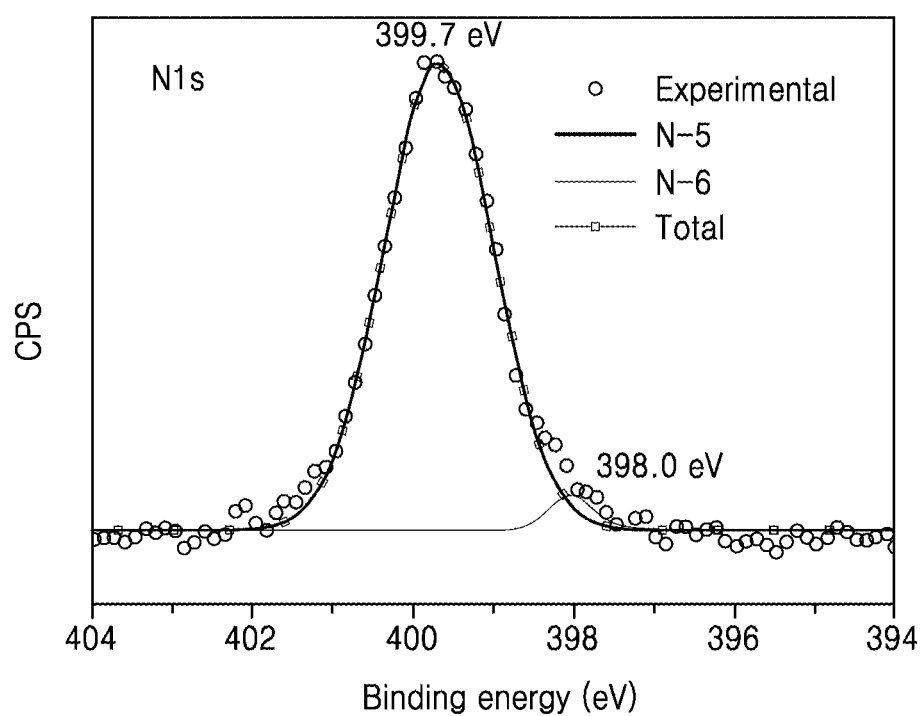

FIGS. 12A to 12C show full scan N1s XPS spectrum analysis results of N-doped carbon nanotubes, for example, N-doped SWCNTs in different concentrations of a nitric acid solution. FIG. 12A shows SWCNTs doped in a 0 M nitric acid solution, FIG. 12B shows N-doped SWCNTs doped in a 2 M nitric acid solution, and FIG. 12C shows N-doped SWCNTs doped in a 4 M nitric acid solution.

Referring to FIGS. 12A to 12C, two sub-peaks were observed at 398.0 eV and 399.7 eV, each is formed by pyridinic N (N6) and pyrrolic N (N5). The SWCNTs doped with the 0 M and 2 M nitric acid solutions exhibited peaks only at 399.7 eV corresponding to pyridinic N, and the SWCNTs doped with the 4 M nitric acid solution exhibited a main peak by pyrrolic N and a very weak peak by pyridinic N. Since SWCNTs generally include more pyridinic lattice sites than pyrrolic lattice sites, it may be assumed that pyrrolic defects are more than pyridinic defects due to an increase in pyrrolic vacancy in SWCNTs by strong mechanical force by ultrasonic waves before or during doping.

Therefore, it is confirmed that pyrrolic N peak considerably increases according to the nitrate concentration, and this is also confirmed based on the quantitative analysis results of Table 7 in which the percentage of N1s increases more than twice from 1.26% to 3.24% as the nitrate concentrates increases from 2 M to 4 M.

TABLE 7

| Sample | C1s (%) | N1s (%) | O1s (%) |
|---|---|---|---|
| 0 M SWCNT | 85.89 | 0.38 | 13.73 |
| 2 M N-doped SWCNT | 71.26 | 1.26 | 27.48 |
| 4 M N-doped SWCNT | 70.35 | 3.24 | 26.41 |

The 0.38% of N1s peak observed in the 0 M SWCNTs that were not doped is caused by residual N that is not completed removed during a purification process in the preparation of SWCNT and remaining as an impurity. Graphitic-like N peaks were not observed in all three samples and pyridinic N peak was not observed either which indicates that N doping unusually occurs in SWCNTs more easily by pyrrolic defects than pyridinic defects. In general, N doping by post-processing rarely occurs in SWCNTs unless N doping occurs by direct annealing of ammonia gas at a high temperature (up to 5%). In the case of the 4 M doping in SWCNTs, 3.24% of N doping occurred using a nitrate by post-processing is caused since more vacancies formed in sublattices of the SWCNTs by strong ultrasonic impact accelerate N doping. Such N-doping of SWCNTs increased electrical conductivity of the photocurable 3D printed material and considerably increased electromagnetic wave shielding and absorbing efficiency.

Experimental Example 12

Figure 13A:
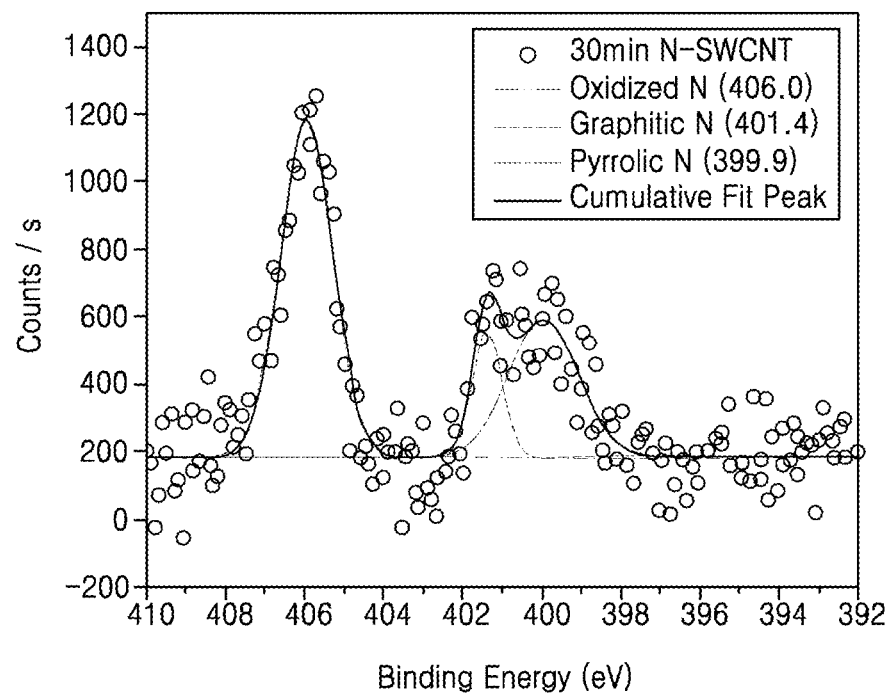
FIGS. 13A and 13B show graphs illustrating changes in the numbers of oxidized N, graphitic N, and pyrrolic N, respectively, after performing a washing process for N-doped SWCNTs and PEDOT:PSS treated N-SWCNTs according to an embodiment of the present invention.

As described above, after doping carbon nanotubes with nitrogen, an additional washing process is required to remove the residual nitric acid solution. FIG. 13A is a graph illustrating changes in the numbers of oxidized N, graphitic N, and pyrrolic N, respectively, after performing a washing process for N-doped carbon nanotubes according to an embodiment of the present invention, e.g., N-doped SWCNTs, once, and FIG. 13B is a graph illustrating changes in the numbers of oxidized N, graphitic N, and pyrrolic N, respectively, after performing a washing process for N-doped SWCNTs treated with PEDOT:PSS, e.g., PEDOT:PSS treated N-SWCNTs, prepared in Preparation Example 2, once.

Figure 13B:
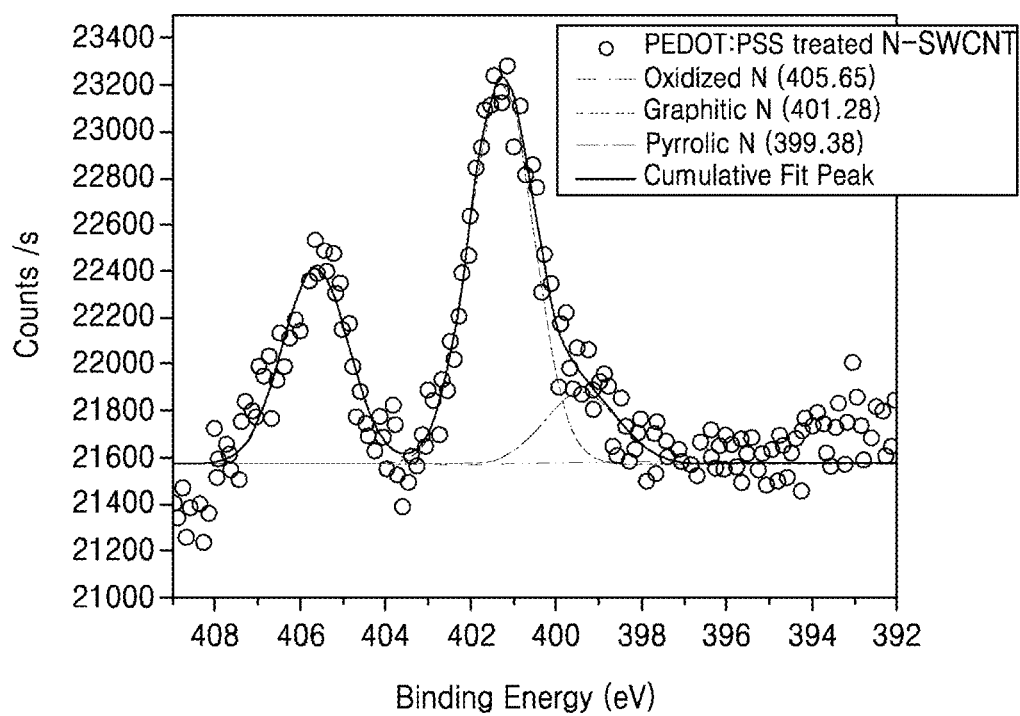

Based on the results FIGS. 13A and 13B, when PEDOT:PSS is formed on the surfaces of N-doped SWCNTs, it may be confirmed that the number of oxidized N considerably decreases and the numbers of graphitic N and pyrrolic N considerably increase even after the washing process compared with the carbon nanotubes simply doped with nitrogen. That is, formation of oxides inside carbon nanotubes may be inhibited by forming PEDOT:PSS, and graphitic N and pyrrolic N affecting conductivity may be protected from the washing process, and thus electrical conductivity of the carbon nanotubes may be stably maintained even after the washing process.

Experimental Example 13

FIG. 14 is a graph illustrating changes in electrical conductivity of N-doped carbon nanotubes, e.g., N-doped SWCNTs, according to an embodiment of the present invention and PEDOT:PSS treated N-SWCNTs prepared in Preparation Example 2 with respect to the number of repeated washing processes. As the same results as those shown in FIGS. 13A and 13B, while electrical conductivity of the N-doped SWCNTs rapidly decreases as the number of the washing process increases, electrical conductivity of PEDOT:PSS treated N-SWCNTs prepared by forming PEDOT:PSS on at least one portion of the surface of N-doped carbon nanotubes is maintained at a constant level without decreasing although the washing process is repeated.

<Preparation Example 4> Preparation of Printed Material with Photocurable 3D Printer Using N-DOPED SWCNT (200)

0.1 wt % of N-doped carbon nanotubes, for example, N-doped SWCNTs, according to an embodiment of the present invention as conductive nanostructures were used and 40 wt % of ACMO was added thereto and physically dispersed using a high shear stress mixer and ultrasonic dispersion. 60 wt % of a mixture of an acrylate resin and 2-hydroxyethyl acrylate or a mixture of an acrylate oligomer and 4-hydroxybutyl acrylate, as a photocurable resin, e.g., an acrylate-based photocurable resin, was added to the nanostructure dispersion. 0.1 wt % of Triton X-100 was mixed therewith to prepare a conductive composite resin composition for photocurable 3D printing.

Then, the photocurable 3D printer tray was filled in a photocurable 3D printer tray and a 3D structure having a spring shape was printed according to a designed file. The spring-shaped 3D structure may be used in various sensors, e.g., wearable sensors or pressure sensors. In this case, printing conditions such as shapes of the filled nanostructure, type and composition ratio of the photoreactive viscosity decreasing agent, thickness of a cured layer according to required printing time, exposure time, formation of an aid, lift distance, and lift speed may be adjusted.

A support of the 3D structure printed according to the above-described method was removed. The support may be omitted according to printing type.

Thereafter, a post-curing process was performed to improve hardness of the 3D structure.

Experimental Example 14

Figure 15A:
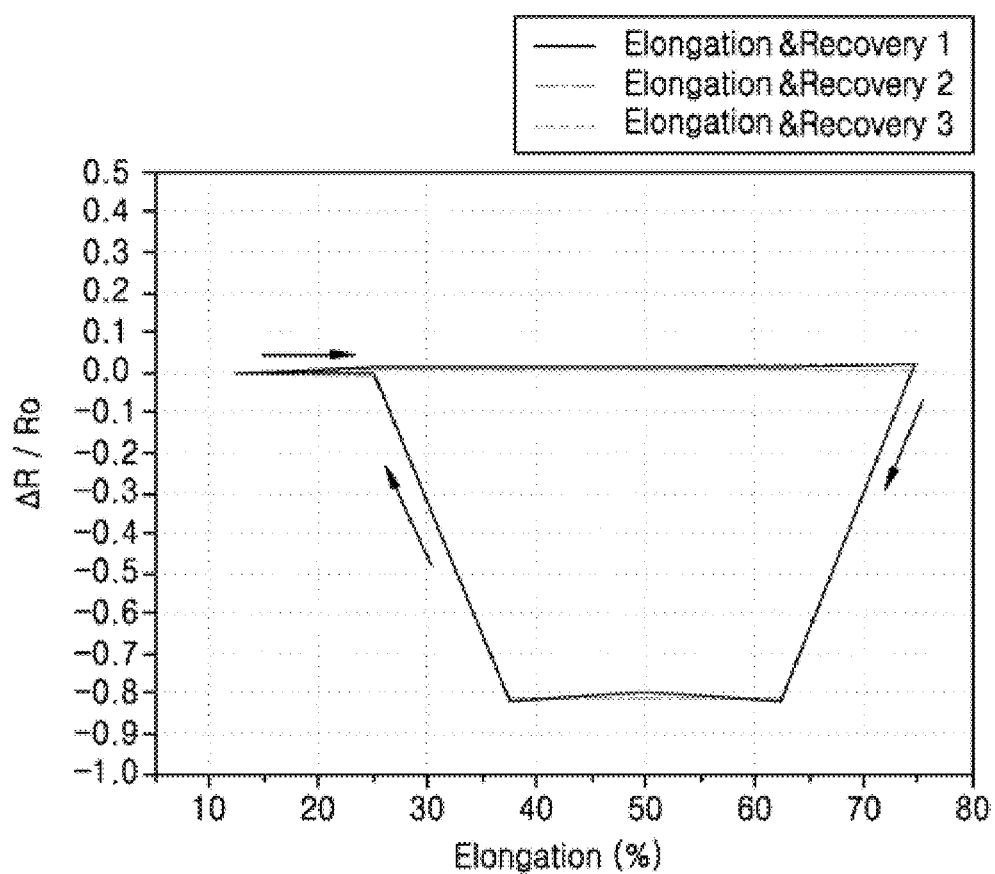
FIGS. 15A and 15B show graphs illustrating change in resistance according to elongation and compression of a spring in a wearable sensor when a photocurable 3D printed material using N-doped SWCNTs is applied to the sensor according to an embodiment of the present invention.
Figure 15B:
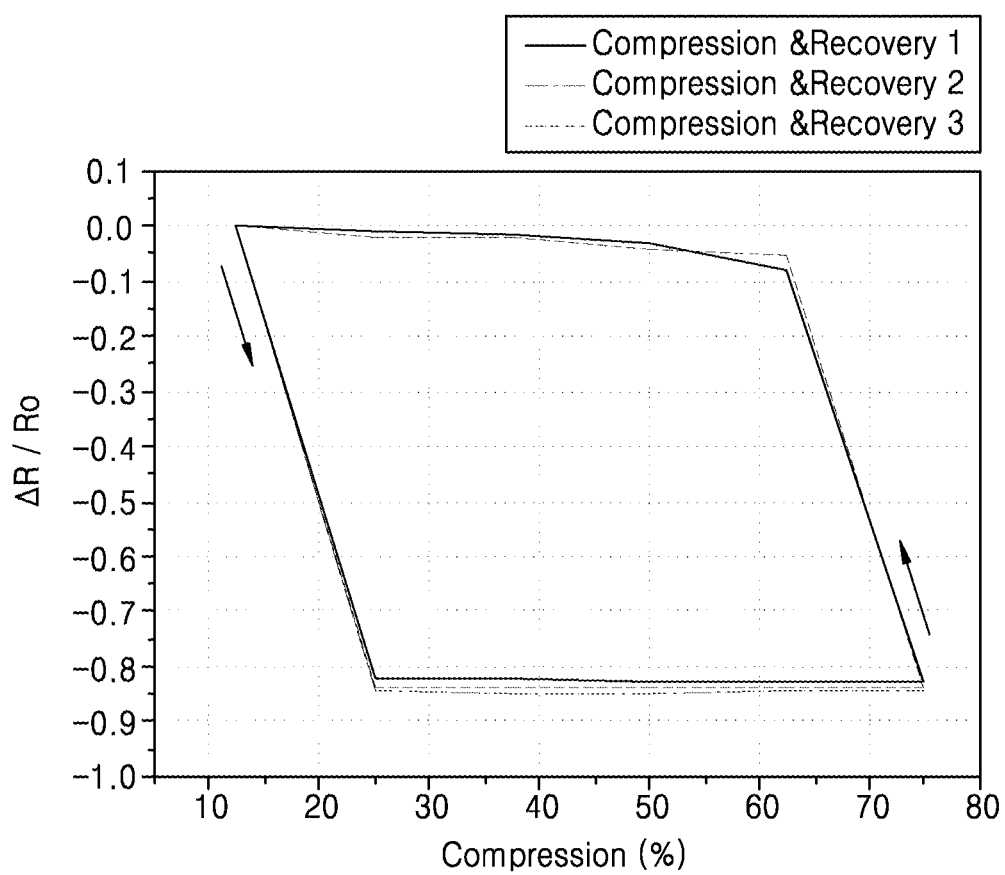

FIG. 15A is a graph illustrating changes in resistance according to elongation and recovery of a spring in a wearable sensor when the photocurable 3D printed material prepared in Preparation Example 4 is applied to the sensor, and FIG. 15B is a graph illustrating changes in resistance according to compression and recovery of the spring in the sensor.

Referring to FIGS. 15A and 15B, although the spring is elongated, no change in resistance was observed. However, when the spring is recovered, the resistance drops and maintained, and then increases to return to the original value. During this process, formation of hysteresis may be confirmed. Even after repeating the elongation and recovery tests 3 times, almost the same hysteresis is shown. In the case of compression, when the spring is compressed by 25%, resistance rapidly decreases and maintained. When the spring is recovered, the resistance increases to return to the original value. That is, hysteresis is also observed in the compression test, and even after repeating the compression and recovery test 3 times, almost the same hysteresis is shown.

<Preparation Example 5> Preparation of Printed Material with Photocurable 3D Printer Using PEDOT:PSS Treated N-SWCNT (200)

A conductive composite resin composition was prepared and a printed material was prepared with a photocurable 3D printer using the same in the same manner as in Preparation Example 4, except that 0.1 wt % of PEDOT:PSS treated N-SWCNTs prepared in Preparation Example 2 were used as conductive nanostructures, unlike Preparation Example 4.

Experimental Example 15

Figure 16A:
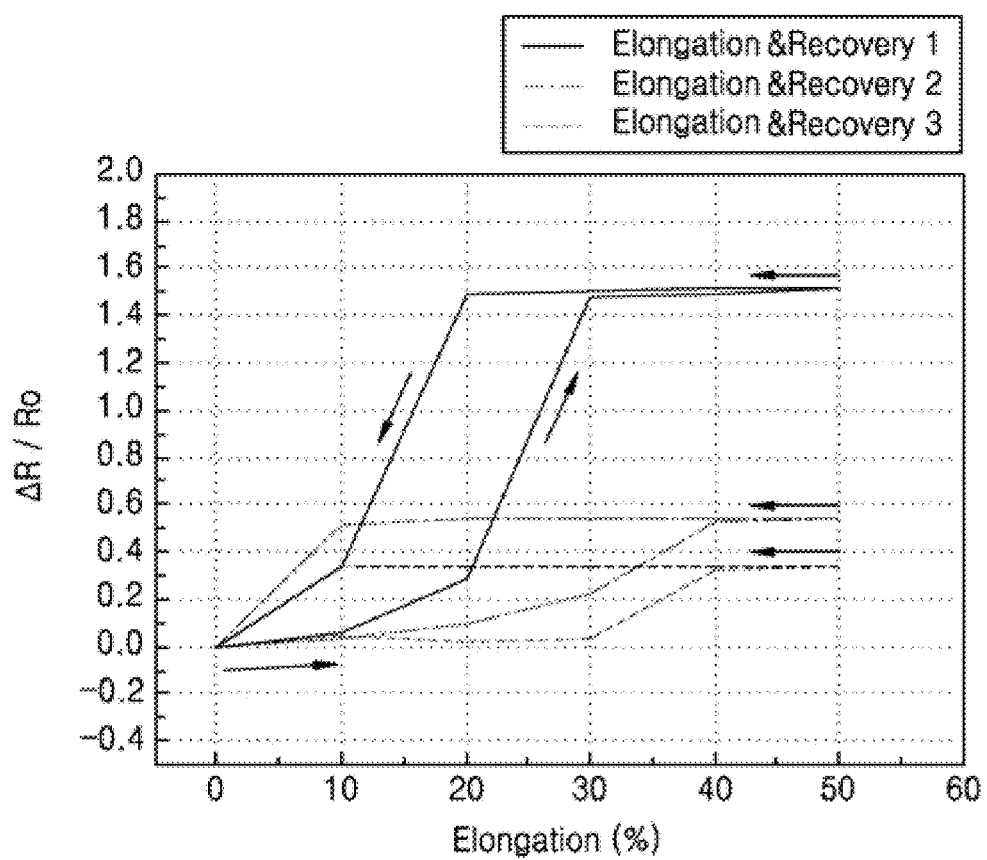
FIGS. 16A and 16B show graphs illustrating changes in resistance according to elongation and compression of a spring in a wearable sensor when a photocurable 3D printed material using PEDOT:PSS treated N-SWCNTs is applied to the sensor according to an embodiment of the present invention.
Figure 16B:
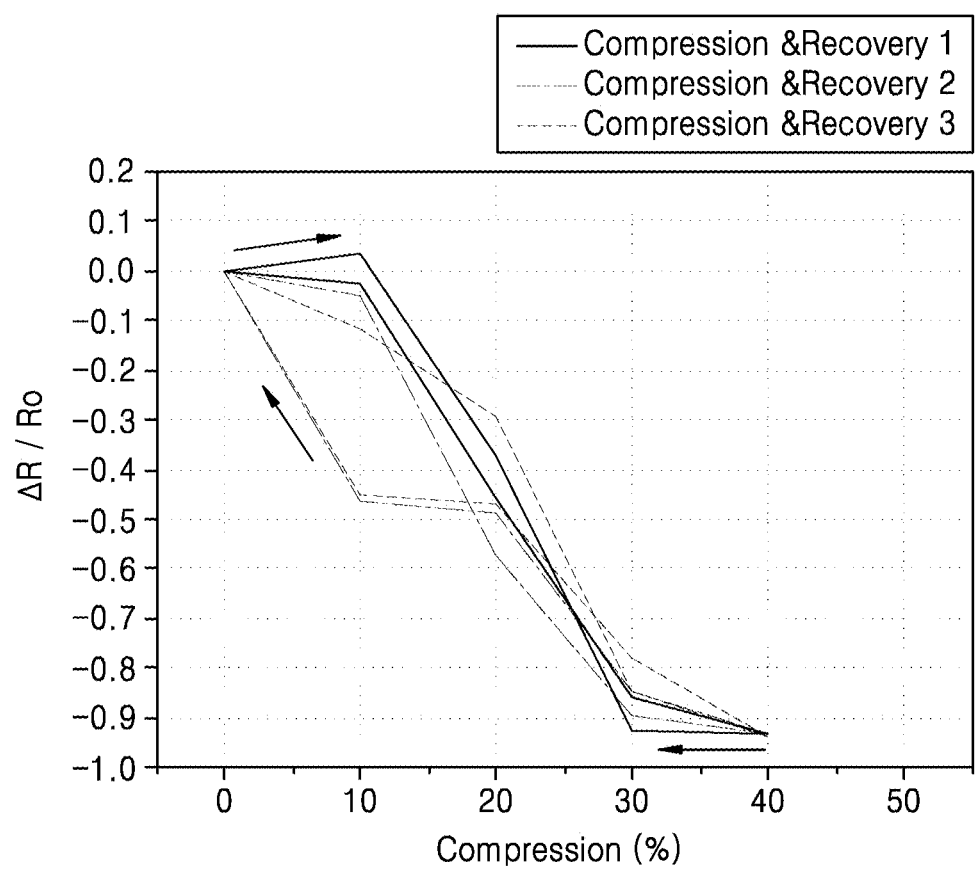

FIG. 16A is a graph illustrating changes in resistance according to elongation and recovery of a spring in a wearable sensor when the photocurable 3D printed material prepared in Preparation Example 5 is applied to the sensor, and FIG. 16B is a graph illustrating changes in resistance according to compression and recovery of the spring in the sensor.

Referring to FIGS. 16A and 16B, the results are opposite to those of Experimental Example 14 in which shapes of hysteresis vary as the elongation and recovery test and the compression and recovery test are repeated. That is, total resistance tends to decrease as the elongation and compression tests are repeated.

While one or more embodiments of the present invention have been described with reference to the drawings, it will be understood by those of ordinary skill in the art that various changes in form and details may be made therein without departing from the spirit and scope of the present invention as defined by the following claims.

What is claimed is:
1. A conductive composite resin composition for photocurable three-dimensional (3D) printing comprising:
    a photoreactive viscosity decreasing agent, a photocurable resin, and conductive nanostructures;
    wherein;
    the photoreactive viscosity decreasing agent is present in an amount of 10 to 90 wt % of the conductive composite resin composition; the photocurable resin is present in an amount of 10 to 90 wt % of the conductive composite resin composition;
    the conductive nanostructures are present in an amount of 0.01 to 1 wt % of the conductive composite resin composition;
    the conductive nanostructures are nitrogen-doped carbon nanotubes that comprise at least one type selected from the group consisting of nitrogen-doped single-walled carbon nanotubes (SWCNTs) in which PEDOT:PSS is formed on at least one portion of a surface of said nitrogen-doped SWCNTs, nitrogen-doped double-walled carbon nanotubes (DWCNTs) in which PEDOT:PSS is formed on at least one portion of a surface of said nitrogen-doped DWCNTs, and nitrogen-doped multi-walled carbon nanotubes (MWCNTs) in which PEDOT:PSS is formed on at least one portion of a surface of said nitrogen-doped MWCNTs; and
    the conductive composite resin composition has a viscosity of 400 cP or less at a shear rate of 58 s$^{-1}$ after being defoamed at a temperature of 35° C. or below.

2. The conductive composite resin composition of claim 1, further comprising a dispersion stabilizer present in an amount of 0.1 to 20 wt % of the conductive composite resin composition.

3. The conductive composite resin composition of claim 1, wherein when the conductive nanostructures are nitrogen-doped multi-walled carbon nanotubes (MWCNTs) in which PEDOT:PSS is formed on at least one portion of a surface of said nitrogen-doped MWCNTs, the conductive nanostructures are present in an amount of 0.5 to 1 wt % of the conductive composite resin composition.

4. The conductive composite resin composition of claim 1, wherein when the conductive nanostructures are nitrogen-doped single-walled carbon nanotubes (SWCNTs) in which PEDOT:PSS is formed on at least one portion of a surface of said nitrogen-doped SWCNTs, the conductive nanostructures are present in an amount of 0.01 to 0.1 wt % of the conductive composite resin composition.

5. The conductive composite resin composition of claim 1, wherein the conductive nanostructures are present in an amount of 0.02 to 0.08 wt % of the conductive composite resin composition.

6. The conductive composite resin composition of claim 1, wherein the photoreactive viscosity decreasing agent comprises at least one type selected from the group consisting of acryloyl morpholine (ACMO), 1,9-nonanediol diacrylate (NDDA), triethylene glycol diacrylate (TEGDA), triethylene glycol dimethacrylate (TEGDMA), polyethylene glycol diacrylate (PEGDA), tripropylene glycol diacrylate (TPGDA), trimethylolpropane triacrylate (TMPTA), isobornyl acrylate (IBOA), 4-hydroxybutyl acrylate (4-HBA), hexanediol diacrylate (HDDA), and hexanediol diacrylate dimethacrylate (HDDMA).

7. The conductive composite resin composition of claim 1, wherein the photocurable resin comprises at least one type selected from the group consisting of epoxy acrylate, polyester acrylate, urethane acrylate, polyether acrylate, and silicone acrylate.

8. A photocurable three-dimensional (3D) printed material formed from the conductive composite resin composition according to claim 1.

9. The photocurable 3D printed material of claim 8, wherein when acryloyl morpholine (ACMO) is used as the photoreactive viscosity decreasing agent, an $I_{N-C=O}/I_{C=O}$ ratio of the printed material is in the range of 5% to 95%.

10. The photocurable 3D printed material of claim 8, wherein the printed material has an increasing electromagnetic wave shielding efficiency as a frequency increases.

* * * * *